(12) United States Patent
Matsuura et al.

(10) Patent No.: US 7,573,949 B2
(45) Date of Patent: Aug. 11, 2009

(54) TRANSMITTER CIRCUIT, TRANSMISSION METHOD, AND COMMUNICATIONS DEVICE USING THE TRANSMITTER CIRCUIT

(75) Inventors: Toru Matsuura, Osaka (JP); Hisashi Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 569 days.

(21) Appl. No.: 11/520,836

(22) Filed: Sep. 14, 2006

(65) Prior Publication Data

US 2007/0009062 A1    Jan. 11, 2007

Related U.S. Application Data

(63) Continuation of application No. PCT/JP2005/020517, filed on Nov. 9, 2005.

(30) Foreign Application Priority Data

Nov. 17, 2004   (JP)   ............................. 2004-332815

(51) Int. Cl.
*H04L 27/00* (2006.01)
(52) U.S. Cl. ...................... 375/295; 375/298; 375/300; 375/302
(58) Field of Classification Search ................. 375/295, 375/298, 302, 300
See application file for complete search history.

(56) References Cited

U.S. PATENT DOCUMENTS 5,847,602 A  12/1998 Su 5,973,556 A  10/1999 Su
7,372,917 B2 * 5/2008 Jensen .......................... 375/296

(Continued)

FOREIGN PATENT DOCUMENTS

JP         10-256843        9/1998

(Continued)

OTHER PUBLICATIONS

David K. Su et al., "An IC for Linearizing RF Power Amplifiers Using Envelope Elimination and Restoration", IEEE Journal of Solid-State Circuit, vol. 33, No. 12, Dec. 1998, pp. 2252-2258.

(Continued)

*Primary Examiner*—Emmanuel Bayard
(74) *Attorney, Agent, or Firm*—Wenderoth, Lind & Ponack, L.L.P.

(57) ABSTRACT

Provided is a transmitter circuit capable of outputting a transmission signal having high accuracy irrespective of bandwidth and operating with high efficiency. In the transmitter circuit 1, a delay detection section 18 selects two observation points at which angle change amounts of the complex envelope are larger than a predetermined angle threshold value and selects, as a singular point, an observation point at which a magnitude of the complex envelope is larger than that at one of the two observation points. Based on a positional relationship among the singular point, a preceding symbol, and a succeeding symbol, a relationship between delay times of the amplitude signal and the phase signal is detected. Based on the relationship between delay times of the amplitude signal and the phase signal, a delay setting section 19 sets a delay time in a delay adjuster 12. Based on the set delay time, the delay adjuster 12 adjusts the delay times of the amplitude signal and the phase signal.

19 Claims, 17 Drawing Sheets

U.S. PATENT DOCUMENTS

| | | | |
|---|---|---|---|
| 2002/0141510 A1 | 10/2002 | Sridharan et al. | |
| 2004/0219891 A1* | 11/2004 | Hadjichristos | 455/102 |
| 2005/0079835 A1* | 4/2005 | Takabayashi et al. | 455/127.1 |
| 2005/0153669 A1 | 7/2005 | Suzuki et al. | |

FOREIGN PATENT DOCUMENTS

| | | |
|---|---|---|
| JP | 2002-530992 | 9/2002 |
| JP | 2004-527953 | 9/2004 |
| JP | 2005-203960 | 7/2005 |
| JP | 2005-244950 | 9/2005 |

OTHER PUBLICATIONS

Je-Kuan Jau et al., "Linear Interpolation Scheme for Compensation of Path-Delay Difference in an Envelope Elimination and Restoration Transmitter", Proceedings of APMC2001, Taipei, Taiwan, R.O.C., vol. 3, Dec. 2001, pp. 1072-1075.

* cited by examiner

F I G. 4 A
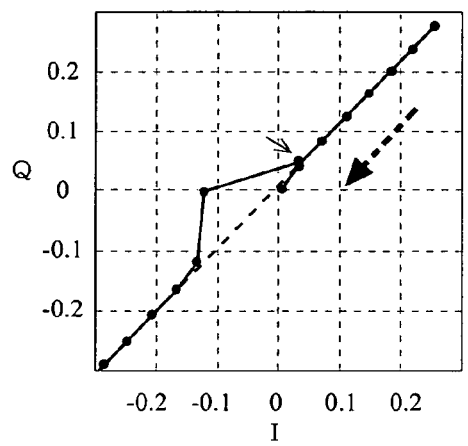
F I G. 4 B
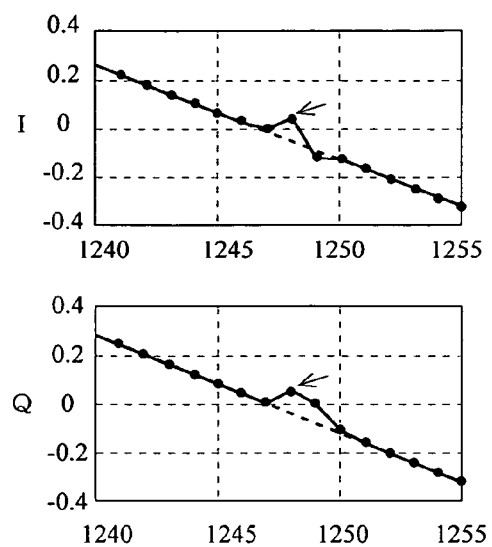
F I G. 4 C
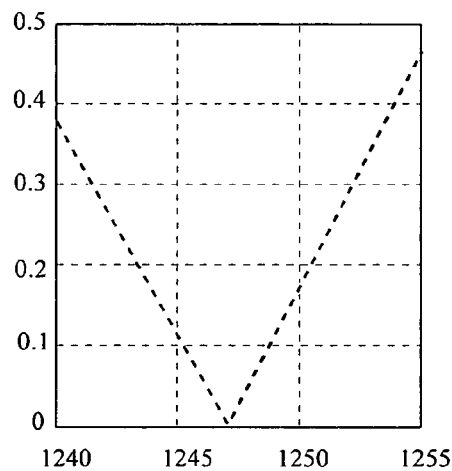
F I G. 4 D
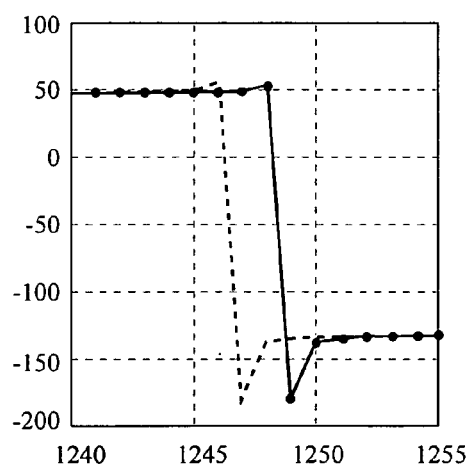

TRANSMITTER CIRCUIT, TRANSMISSION METHOD, AND COMMUNICATIONS DEVICE USING THE TRANSMITTER CIRCUIT

This application is a continuation of International Application PCT/JP2005/020517, filed Nov. 9, 2005.

BACKGROUND OF THE INVENTION

1. Field of the Invention

The present invention relates to a transmitter circuit for use in a communications device such as a mobile telephone and a wireless LAN device and more particularly, to a transmitter circuit capable of outputting a transmission signal having high accuracy irrespective of bandwidth and operating with high efficiency, and a communications device using the transmitter circuit.

2. Description of the Background Art

A communications device such as a mobile telephone, a wireless LAN device, or the like has been required to be capable of ensuring accuracy of an outputted signal and operating with low power consumption. And in such a communications device, a transmitter circuit which outputs a transmission signal having high accuracy irrespective of bandwidth and operates with high efficiency is used. Hereinafter, a conventional transmitter circuit will be described.

As the conventional transmitter circuit, for example, there has been a transmitter circuit (hereinafter, referred to as a quadrature modulation circuit) which generates a transmission signal using a method of modulation such as quadrature modulation. Since the quadrature modulation circuit is widely known, description on the quadrature modulation circuit will be omitted. In addition, as a conventional transmitter circuit which has a smaller size and operates with higher efficiency than the quadrature modulation circuit, for example, there has been a transmitter circuit 500 shown in FIG. 18. FIG. 18 is a block diagram illustrating an exemplary configuration of the conventional transmitter circuit 500. In FIG. 18, the conventional transmitter circuit 500 includes a data generator 501, an angle modulator 502, a voltage control section 503, an amplitude modulator 504, a power source terminal 505, and an output terminal 506.

In the conventional transmitter circuit 500, the data generator 501 generates and outputs an amplitude signal and a phase signal. The amplitude signal is inputted to the voltage control section 503. The phase signal is inputted to the angle modulator 502. The voltage control section 503 supplies to the amplitude modulator 504 a voltage in accordance with the inputted amplitude signal. A DC voltage is supplied to the voltage control section 503 from the power source terminal 505. The voltage control section 503 supplies to the amplitude modulator 504, typically, a voltage in proportion to the inputted amplitude signal. As the voltage control section 503, a series regulator or a switching regulator is used.

The angle modulator 502 angle-modulates the inputted phase signal to be outputted as an angle-modulated signal. The angle-modulated signal outputted from the angle modulator 502 is inputted to the amplitude modulator 504. The amplitude modulator 504 amplitude-modulates the angle-modulated signal, while applying the voltage supplied from the voltage control section 503, to be outputted as a modulated signal which has been angle-modulated and amplitude-modulated. This modulated signal is outputted as a transmission signal from the output terminal 506. Such a transmitter circuit 500 is referred to as a polar modulation circuit.

In the conventional transmitter circuit 500, the amplitude signal and the phase signal are separately single-processed in two paths (angle modulator 502 and voltage control section 503) and jointly amplitude-modulated by the amplitude modulator 504. Therefore, it is likely that a difference between a delay time in an amplitude signal path and a delay time in a phase signal path may occur. Hereinafter, the delay time in the amplitude signal path is referred to as the delay time of the amplitude signal, and the delay time in the phase signal path is referred to the delay time of the phase signal. Because such a difference between the delay times is minute, when the transmitter circuit 500 is applied in a modulation method which has comparatively narrow bandwidth, the difference between the delay time of the amplitude signal and the delay time of the phase signal can be disregarded.

In addition, disclosed in the US Published Application No. 2002/141510A1 (hereinafter, referred to as a patent document 1) is a transmitter circuit which is different from the above-mentioned polar modulation circuit and adjusts the difference between the delay times of the amplitude signal and the phase signal which are contained in a transmission signal. FIG. 19 is a block diagram illustrating a configuration of the conventional transmitter circuit 510 disclosed in the patent document 1. In FIG. 19, the conventional transmitter circuit 510 includes a phase modulator circuit 511, an amplifier 512, an amplifier 513, a delay device 514, and a feedback circuit 515.

The phase signal is inputted via the phase modulator circuit 511 to the amplifier 512. The amplitude signal is inputted via the amplifier 513 and the delay device 514 to the amplifier 512. Based on the inputted phase signal and amplitude signal, the amplifier 512 generates a transmission signal. The transmission signal is inputted to the feedback circuit 515. Based on the inputted transmission signal, the feedback circuit 515 detects a difference between a delay time of the amplitude signal and a delay time of the phase signal.

FIG. 10A, FIG. 20C, and FIG. 20C are diagrams explaining a method for detecting the difference between the delay times by means of the feedback circuit 515. FIG. 20A is a diagram showing a change in the transmission signal by using an in-phase and a quadrature-phase signal in a case where the delay times match. FIG. 20B is a diagram showing a time change in an envelope of the transmission signal in a case of FIG. 20A. FIG. 20C is a diagram showing a time change in a phase of the transmission signal in the case of FIG. 20A. In FIG. 20A, FIG. 20B, FIG. 20C, if the delay times between the amplitude signal and phase signal match, time at which the envelope of the transmission signal is minimum and time at which the phase largely changes should match. Conversely, if there is a difference between the delay times of the amplitude signal and the phase signal, there should be a difference between the time at which the envelope of the transmission signal is minimum and the time at which the phase largely changes. Based on this difference between the time at which the envelope of the transmission signal is minimum and the time at which the phase largely changes, the feedback circuit 2205 is capable of detecting the difference between the delay times of the amplitude signal and the phase signal.

Specifically, the envelope detector 5151 detects an envelope of the transmission signal. A minimum detector 512 detects time at which the envelope of the transmission signal is minimum. A phase jump detector 5153 detects time at which a phase of the transmission signal largely changes. When there is a difference between the time at which the envelope of the transmission signal is minimum and the time at which the phase of the transmission signal largely changes, an adjusting circuit 5154 determines that there is the difference between the delay time of the amplitude signal and the delay time of the phase signal. When the adjusting circuit 5154 determines that there is the difference between the delay time of the amplitude signal and the delay time of the phase signal, the adjusting circuit 5154 adjusts timing of outputting the amplitude signal at the delay device 514, thereby matching the delay times of the amplitude signal and the phase signal. Thus, the conventional transmitter circuit 510 detects the difference between the time at which the envelope of the transmission signal is minimum and the time at which the phase of the transmission signal largely changes, thereby adjusting the delay times of the amplitude signal and the phase signal.

And also in Japanese translation of PCT international application No. 2002-530992 (hereinafter, referred to as a patent document 2), disclosed is a detecting circuit for detecting a difference between delay times of an amplitude signal and a phase signal which are contained in a transmission signal. Since the detecting circuit in the patent document detects the difference between the delay times by using a similar method of the above-mentioned feedback circuit 515, detailed description will be omitted.

However, it is likely that when the conventional transmitter circuit 500 (FIG. 18) is applied in a modulation method which has wide signal bandwidth, the difference between the delay times of the amplitude signal and the phase signal contained in the transmission signal may greatly influence a spectrum and a modulation accuracy of the transmission signal. Therefore, the conventional transmitter circuit 500 has a problem of a difficulty in an application thereof to the modulation method which has the wide bandwidth.

Also in the conventional transmitter circuit 510 (refer to FIG. 19) in which the difference between the delay times of the amplitude signal and the phase signal contained in the transmission signal is adjusted, the delay times of the amplitude signal and the phase signal cannot be accurately adjusted. The reason is that when there is a difference between the delay times of the amplitude signal and the phase signal contained in the transmission signal, there occurs distortion in the envelope of the transmission signal. FIG. 21 is a diagram showing a time change in the envelope of the transmission signal in which distortion has occurred. As shown in FIG. 21, when the envelope of the transmission signal is distorted, the conventional transmitter circuit 510 cannot accurately detect time at which the envelope of the transmission signal is minimum and cannot accurately adjust the delay times of the amplitude signal and the phase signal.

And in the conventional transmitter circuit 510, respective sections (i.e., an envelope detector 5151, a minimum detector 5152, a phase jump detector 5153, and an adjusting circuit 5154) of the feedback circuit 515 are analog components. Therefore, the conventional transmitter circuit 510 has problems of a large circuit scale of the feedback circuit 515 and of large power consumption in the feedback circuit 515. Further, when manufacturing the transmitter circuit 510, because the feedback circuit 515 includes the analog components, there arises a problem that precision of the feedback circuit 515 fluctuates.

SUMMARY OF THE INVENTION

Therefore, an object of the present invention is to provide a transmitter circuit which has a small size, operate with high efficiency, and outputs a transmission signal of high accuracy irrespective of bandwidth, and a communications device using the transmitter circuit.

The present invention is directed to a transmitter circuit capable of generating and outputting a transmission signal based on inputted data. In order to achieve the above-mentioned object, the transmitter circuit according to the present invention comprises a data generator, a delay adjuster, a voltage control section, an angle modulator, and an amplitude modulator.

The data generator generates an amplitude signal and a phase signal. Based on an amplitude delay time which is set to adjust the amplitude signal and/or a phase delay time which is set to adjust the phase signal, the delay adjuster adjusts a delay time of the amplitude signal generated by the data generator and/or a delay time of the phase signal generated by the data generator and outputs the amplitude signal and the phase signal. The angle modulator angle-modulates the phase signal, which is outputted from the delay adjuster, to be outputted as an angle-modulated signal. A regulator outputs a signal in accordance with a magnitude of the amplitude signal outputted from the delay adjuster. The amplitude modulator amplitude-modulates the angle-modulated signal, by amplifying the angle-modulated signal outputted from the angle modulator in accordance with the signal outputted from the regulator, to be outputted as a modulated signal which has been angle-modulated and amplitude-modulated.

A complex envelope of the modulated signal outputted from the amplitude modulator is detected; the detected complex envelope is observed periodically over a period of time; two observation points at which angle change amounts of the complex envelope are larger than a predetermined angle threshold value are selected and an observation point at which a magnitude of the complex envelope is larger than that at one of the two observation points is selected as a singular point; based on a positional relationship of the singular point with respect to a preceding symbol upon modulating the data and a succeeding symbol upon modulating the data, it is determined which one of the amplitude signal and the phase signal is advanced or delayed; and based on a result of the determination, the amplitude delay time and/or the phase delay time are/is set at the delay adjuster so as to decrease a difference between the delay times of an amplitude signal and a phase signal.

Preferably, the transmitter circuit further comprises a delay control section for setting the amplitude delay section and/or the phase delay section. The delay control section includes a complex envelope detection section, a delay detection section, and a delay setting section. The complex envelope detection section detects the complex envelope of the modulated signal outputted from the amplitude modulator. The delay detection section observes, periodically per predetermined period of time, the complex envelope detected by the complex envelope detection section; selects two observation points at which angle change amounts of the complex envelope are larger than a predetermined angle threshold value and selects, as a singular point, an observation point at which a magnitude of the complex envelope is larger than that at one of the two observation points; and determines, based on a positional relationship of the singular point with respect to a preceding symbol upon modulating the data and a succeeding symbol upon modulating the data, which one of the amplitude signal and the phase signal is advanced or delayed. The delay setting section sets the amplitude delay time and/or the phase delay time at the delay adjuster based on the determination result so as to decrease the difference between the delay times of the amplitude signal and the phase signal.

Preferably, the delay detection section selects the singular point based on the angle change amount of the complex envelope represented by quadrature data and determines that the phase signal is delayed from the amplitude signal when the selected singular point is in vicinity to the preceding symbol and that the amplitude signal is delayed from the phase signal when the selected singular point is in vicinity to the succeeding symbol. Thus, the transmitter circuit enables adjustment of the delay times of the amplitude signal and the phase signal with good accuracy even when there is distortion in a transmission signal.

The delay detection section may select the singular point based on the angle change amount of the complex envelope represented by a relationship between an amplitude and time; select two observation points at which angle change amounts of the complex envelope are larger than a predetermined angle threshold value and select an observation point at which a magnitude of the complex envelope is smaller than that at one of the two observation points; and determine that the amplitude signal is delayed from the phase signal when the singular point is nearer to the preceding symbol than the selected observation point and that the phase signal is delayed from the amplitude signal when the singular point is nearer to the succeeding symbol than the selected observation point. Also in this case, the transmitter circuit enables adjustment of the delay times of the amplitude signal and the phase signal with good accuracy even when there is distortion in a transmission signal.

The delay setting section sets, based on the determination result obtained in the delay detection section, the amplitude delay time or the phase delay time at the delay adjuster so that a preceding one of the amplitude signal or the phase signal is delayed by a predetermined period of time.

Preferably, the delay detection section further calculates a difference between the delay times of the amplitude signal and the phase signal based on the positional relationship of the singular point with respect to the preceding symbol and the succeeding symbol. And the delay setting section sets the amplitude delay time and the phase delay time at the delay adjuster based on the determination result obtained at the delay detection section so that a delay time of a preceding one of the amplitude signal and the phase signal is delayed by a calculated difference between the delay times.

Here, the angle change amount of the complex envelope is calculated based on an angle change in a linear curve connecting the above observation points on the complex envelope.

Preferably, the delay detection section includes a differentiation section for differentiating the complex envelope per the observation point; an angle detection section for detecting an angle, to be outputted as an angle signal, of the complex envelope differentiated at the differentiation section; a delay circuit, to which a part of the angle signal outputted from the angle detection section is inputted, for delaying the inputted angle signal; a comparison section for comparing the angle signal outputted from the angle detection section and the angle signal delayed by the delay circuit and detecting an angle change amount of the complex envelope; and a delay determination section for selecting the singular point based on the angle change amount of the complex envelope and determining, based on the positional relationship of the singular point with respect to the preceding symbol and the succeeding symbol, which one of the amplitude signal and the phase signal is advanced or delayed.

The regulator is a voltage control type series regulator, a voltage control type switching regulator, and a current control type regulator.

Preferably, the transmitter circuit further comprises a predistorter for compensating the amplitude signal and the phase signal, which are generated by the data generator, so as to suppress distortion generated in at least either one of the angle modulator and the amplitude modulator. Thus, the transmitter circuit is capable of outputting a transmission signal having distortion reduced.

And when the magnitude of the complex envelope is larger than the predetermined amplitude threshold value, the transmitter circuit may not cause the delay detection section to operate. Thus the transmitter circuit can prevent unnecessary adjustment of the delay times, thereby reducing power consumption.

A test signal generated so as to reduce the magnitude of the complex envelope is inputted to the delay detection section and based on the inputted test signal, the transmitter circuit causes the delay detection section operate. Thus, even if the magnitude of the complex envelope is not smaller than a predetermined threshold value, the transmitter circuit is capable of outputting a transmission signal in which the delay times are adjusted and distortion is reduced.

The amplitude delay time and/or the phase delay time may be previously set at the delay adjuster. In this case, the amplitude delay time and/or the phase delay time are/is set at the delay adjuster by the delay control circuit. The delay control circuit includes a complex envelope detection section, a delay detection section, and a delay setting section. The complex envelope detection section detects the complex envelope of the modulated signal outputted from the amplitude modulator. The delay detection section observes, periodically per predetermined period of time, the complex envelope detected by the complex envelope detection section; selects two observation points at which angle change amounts of the complex envelope are larger than a predetermined angle threshold value and selects, as a singular point, an observation point at which a magnitude of the complex envelope is larger than that at one of the two observation points; and determines based on a positional relationship of the singular point with respect to a preceding symbol upon modulating the data and a succeeding symbol upon modulating the data, which one of the amplitude signal and the phase signal is advanced or delayed. The delay setting section sets the amplitude delay time and/or the phase delay time at the delay adjuster based on the determination result so as to decrease the difference between the delay times of the amplitude signal and the phase signal.

The present invention is also directed to a communications device comprising the transmitter circuit. The communications device comprises the transmitter circuit for generating a transmission signal and an antenna for outputting the transmission signal generated by the transmitter circuit. The communications device may further comprise a receiver circuit for processing a signal received from the antenna and an antenna duplexer for outputting the transmission signal generated by the transmitter circuit and outputting the signal received from the antenna to the receiver circuit.

Respective processes performed by the data generator, the delay adjuster, the voltage control section, the angle modulator, and the amplitude modulator which are included in the transmitter circuit can be seen as a transmission method in which based on inputted data, a transmission signal is generated and outputted.

In the transmission method, in the transmitter circuit, an amplitude signal and a phase signal are respectively generated; based on an amplitude delay time which is set for adjusting the amplitude signal and/or a phase delay time which are/is set for adjusting the phase signal, a delay time of the amplitude signal generated by the data generator and/or a delay time of the phase signal generated by the data generator are/is adjusted and the amplitude signal and the phase signal are outputted; the outputted phase signal is angle-modulated and outputted as an angle-modulated signal; a signal in accordance with a magnitude of the amplitude signal is outputted; the angle-modulated signal, by amplifying the angle-modulated signal outputted from the angle modulator in accordance with the signal outputted from the regulator, is outputted as a modulated signal which has been angle-modulated and amplitude-modulated; a complex envelope of the outputted modulated signal is detected; the detected complex envelope is observed periodically over a period of time; two observation points at which angle change amounts of the complex envelope are larger than a predetermined angle threshold value are selected and an observation point at which a magnitude of the complex envelope is larger than that at one of the two observation points is selected as a singular point; based on a positional relationship of the singular point with respect to a preceding symbol upon modulating the data and a succeeding symbol upon modulating the data, it is determined which one of the amplitude signal and the phase signal is advanced or delayed; and based on a determination result, the amplitude delay time and/or the phase delay time are/is set at the delay adjuster so as to decrease a difference between the delay times of an amplitude signal and a phase signal.

As described above, the transmitter circuit according to the present invention is capable of operating with higher efficiency and achieves a smaller size than the conventional transmitter circuit which generates a transmission signal using a modulation method such as a quadrature modulation. And since the conventional polar modulation circuit cannot adjust the delay times of the amplitude signal and the phase signal which are contained in the transmission signal, the conventional polar modulation circuit cannot be applied to a communication method which has wide bandwidth. On the other hand, in the transmitter circuit according to the present invention, the delay control section sets, at the delay adjuster, the amplitude delay time and/or the phase delay time so as to decrease the difference between the delay times of the amplitude signal and the phase signal which are contained in the transmission signal; adjusts the delay time of the amplitude signal generated by the data generator and/or the delay time of the phase signal generated by the data generator; and outputs the amplitude signal and the phase signal. Thus, the transmitter circuit according to the present invention enables adjustment of the delay times of the amplitude signal and the phase signal and is capable of outputting a transmission signal in which the delay times of the amplitude signal and the phase signal match and the distortion is reduced.

In addition, the transmitter circuit according to the present invention includes digital components (i.e., the complex envelope detection section, the delay detection section, and the delay setting section), downsizing and high-efficiency operation is enabled as compared to the conventional transmitter circuit which includes a feedback circuit having analog components.

And in the transmitter circuit according to the present invention, the delay control section which is externally included sets the amplitude delay time and/or the phase delay time at the delay adjuster when the transmitter circuit is manufactured or power is turned on. Thus, even if the delay control section is not internally included, the transmitter circuit is capable of outputting a transmission signal in which the delay times of the amplitude signal and the phase signal match and the distortion is reduced.

And the communications device according to the present invention can ensure accuracy of an outputted signal in wide bandwidth by using the above-mentioned transmitter circuit and operate with low power consumption.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4A, FIG. 4B, FIG. 4C, and FIG. 4D are simulation results obtained when the phase signal is delayed from the amplitude signal by 2 samples;

DESCRIPTION OF THE PREFERRED EMBODIMENTS

Hereinafter, with reference to figures, each embodiment of the present invention will be described.

First Embodiment

Figure 1:
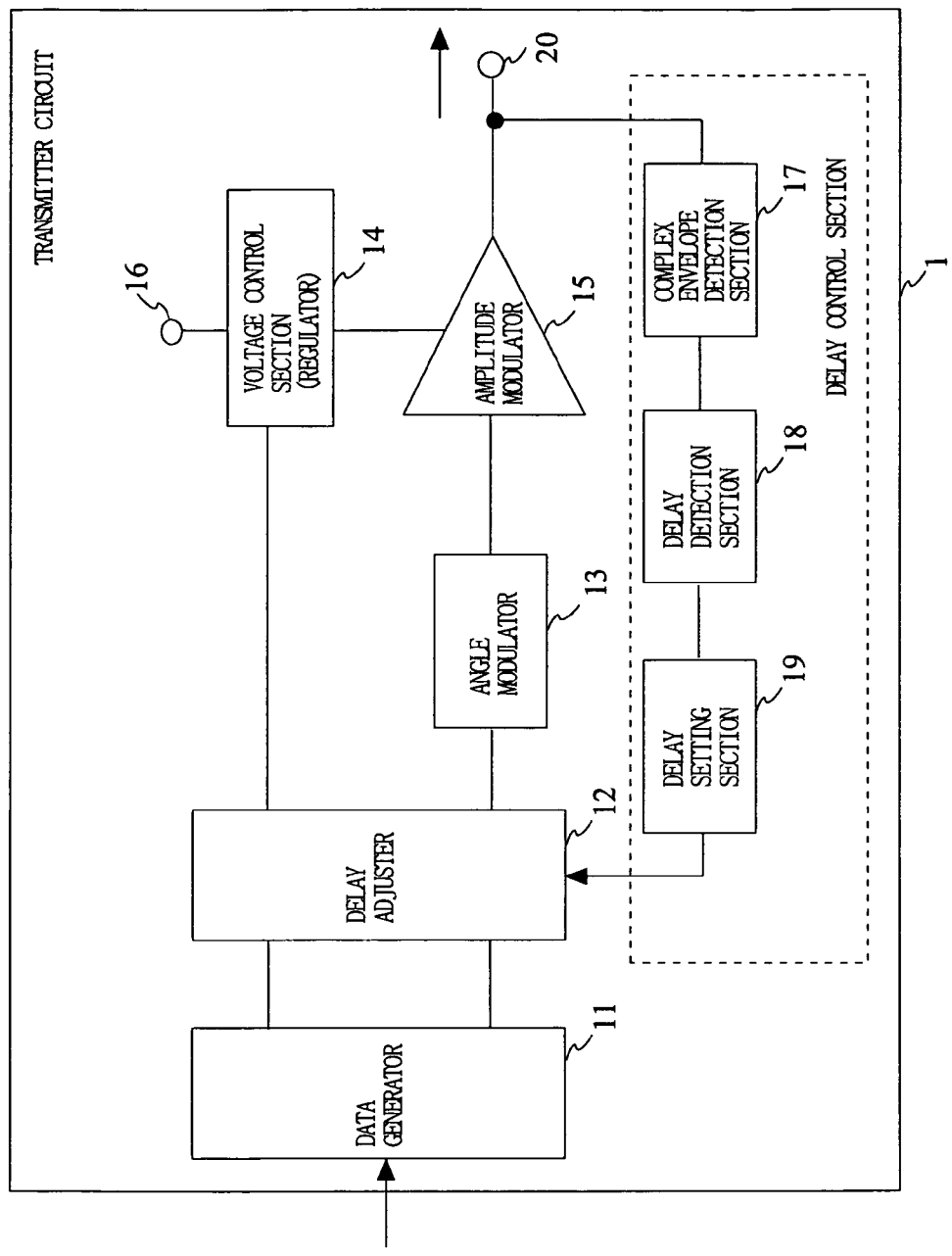
FIG. 1 is a block diagram illustrating an exemplary configuration of a transmitter circuit 1 according to a first embodiment of the present invention.

FIG. 1 is a block diagram illustrating an exemplary configuration of a transmitter circuit 1 according to a first embodiment of the present invention. In FIG. 1, the transmitter circuit 1 according to the first embodiment includes a data generator 11, a delay adjuster 12, an angle modulator 13, a voltage control section (regulator) 14, an amplitude modulator 15, a power source terminal 16, a complex envelope detection section 17, a delay detection section 18, a delay setting section 19, and an output terminal 20.

The data generator 11 generates an amplitude signal and a phase signal based on inputted data. The delay adjuster 12 adjusts a delay time of at least one of the amplitude signal and the phase signal. The angle modulator 13 outputs angle-modulates the phase signal to be outputted as an angle-modulated signal. The voltage control section 14 supplies to the amplitude modulator 15, as a bias voltage, a voltage controlled in accordance with a magnitude of the amplitude signal. The amplitude modulator 15, while applying the bias voltage supplied from the voltage control section 14, amplitude-modulates the angle-modulated signal to be outputted as a modulated signal which has been angle-modulated and amplitude-modulated. The complex envelope detection section 17 detects a complex envelope of the modulated signal outputted from the amplitude modulator 15. As the complex envelope detection section 17, for example, a quadrature demodulator is used. Based on a change in the complex envelope, the delay detection section 18 detects a difference between delay times of the amplitude signal and the phase signal. The delay setting section 19 sets a delay time at the delay adjuster 12 so that the delay times of the amplitude signal and the phase signal match. And the complex envelope detection section 17, the delay detection section 18, and the delay setting section 19 are collectively referred to as a delay control section.

The transmitter circuit 1 may include a current control section instead of the voltage control section 14. The current control section supplies to the amplitude modulator 15, as a bias current, a current controlled in accordance with a magnitude of the amplitude signal. In this case, the amplitude modulator 15 amplitude-modulates, while applying the bias current supplied from the current control section, the angle-modulated signal to be outputted as a modulated signal which has been angle-modulated and amplitude-modulated.

Hereinafter, operations of the transmitter circuit 1 according to the first embodiment will be described. In the transmitter circuit 1, the data generator 11 generates and outputs the amplitude signal and the phase signal. The phase signal is inputted via the delay adjuster 12 to the angle modulator 13. The angle modulator 13 angle-modulates the phase signal to be outputted as an angle-modulated signal. As the angle modulator 13, a modulator using a quadrature modulator or a PLL is used. The angle-modulated signal outputted from the angle modulator 13 is inputted to the amplitude modulator 15.

On the other hand, the amplitude signal is inputted via the delay adjuster 12 to the voltage control section 14. And a DC voltage is supplied to the voltage control section 14 from the power source terminal 16. The voltage control section 14 supplies to the amplitude modulator 15, as a bias voltage, a voltage controlled in accordance with the magnitude of the amplitude signal. The voltage control section 14, typically, supplies to the amplitude modulator 15 a voltage in proportion to a magnitude of the amplitude signal. The amplitude modulator 15 amplifies the angle-modulated signal in accordance with the voltage (i.e., bias voltage) supplied from the voltage control section 14, thereby amplitude-modulating the angle-modulated signal to be outputted as a modulated signal. The modulated signal outputted from the amplitude modulator 15 is outputted as a transmission signal from the output terminal 20.

And a part of the modulated signal outputted from the amplitude modulator 15 is inputted to the delay control section. In the delay control section, the complex envelope detection section 17 detects a complex envelope of the modulated signal. This detected complex envelope changes depending on a relationship between the delay times of the amplitude signal and the phase signal (refer to FIG. 2A, FIG. 2B, and FIG. 2C). Here, the relationship between the delay times of the amplitude signal and the phase signal will be described. The amplitude signal and the phase signal generated by the data generator 11 are signal-processed in separate paths (voltage control section 14 and angle modulator 13) and amplitude-modulated by the amplitude modulator 15. Therefore, until the amplitude signal and the phase signal are amplitude-modulated by the amplitude modulator 15, respective and different delay times (i.e., a difference between the delay times) occur. The relationship between the delay times of the amplitude signal and the phase signal refers to a difference (i.e., a relationship showing which one of the amplitude signal and the phase signal is advanced or delayed) between the delay times of the amplitude signal and the phase signal, which is caused by different paths reaching an output at the amplitude modulator 15.

The complex envelope detected by the complex envelope detection section 17 is inputted to the delay detection section 18. The delay detection section 18 observes the complex envelope periodically per predetermined time (i.e., digitally), thereby detecting an angle change amount of the complex envelope. The angle change amount of the complex envelope can be calculated by using the angle change of a straight line connecting respective observation points on the complex envelope. And based on the angle change in the complex envelope, the delay detection section 18 determines which one of the amplitude signal and the phase signal is advanced or delayed. The relationship between the delay times of the amplitude signal and the phase signal, which is detected by the delay detection section 18, is notified to the delay setting section 19.

Based on the relationship between the delay times, which is detected by the delay detection section 18, the delay setting section 19 sets a delay time or delay times (i.e., an amplitude delay time for adjusting the amplitude signal and/or a phase delay time for adjusting the phase signal) of either one or both of the signals so as to match the delay times of the amplitude signal and the phase signal. For example, the delay setting section 19 may set the delay time, which is at the delay adjuster 12, so as to delay one, of the amplitude signal and the phase signal, which is ahead and to advance one, of the amplitude signal and the phase signal, which is delayed. And the delay adjuster 12 may set the delay times which are set at the delay adjuster 12 by delaying the signal which is ahead and advancing the signal which is delayed.

Based on the delay times which are set at the delay setting section 19, the delay adjuster 12 adjusts at least one of the delay times of the amplitude signal and the phase signal which are generated by the data generator 11. In other words, based on the set delay times, the delay adjuster 12 adjusts output timing of at least one of the amplitude signal and the phase signal. Regarding the voltage control section 14, the amplitude modulator 15, and the delay detection section 18, detailed descriptions will be given later by showing specific exemplary configurations.

And two methods in which the delay control section and the delay adjuster 12 match the delay times of the amplitude signal and the phase signal are considered. One method is to match the delay times in a consecutive manner. In this case, based on an angle change in the complex envelope, the delay control section and the delay adjuster 12 determine which one of the amplitude signal and the phase signal is advanced (or delayed) and delays by a predetermined period of time (for example, 1 sample) the signal which is ahead (or advances by the predetermined period of time the signal which is delayed). Thereafter, the delay control section and the delay adjuster 12 determines again which one of the signals is ahead and delays by the predetermined period of time the signal which is ahead. The delay control section and the delay adjuster 12 repeats this process until the difference between the delay times becomes acceptable, thereby enabling the delay times of the amplitude signal and the phase signal to match. Although control in this method is easy, the method has a disadvantage of requiring time until the delay times of the amplitude signal and the phase signal match. Another method is to match the delay times at one time by calculating the difference between the delay times based on a change in the complex envelope and delaying, by the calculated difference between the delay times, the signal which is advanced (or advances the signal which is delayed). Although control in this method is complex since the difference between the delay times is calculated, the delay times can be matched for a short period of time.

Figure 2A:
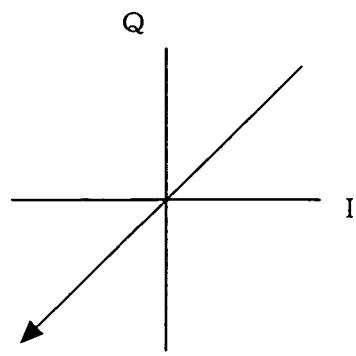
FIG. 2A, FIG. 2B, and FIG. 2C are diagrams explaining ways in which a complex envelope of a modulated signal is changed by a difference between delay times.
Figure 2B:
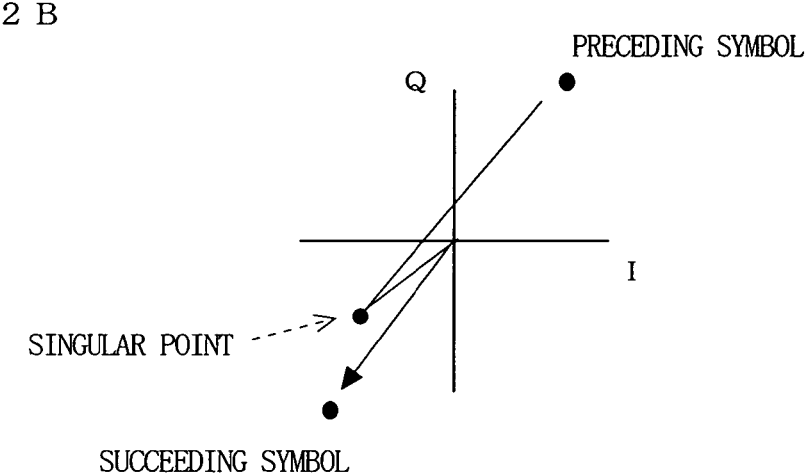
Figure 2C:
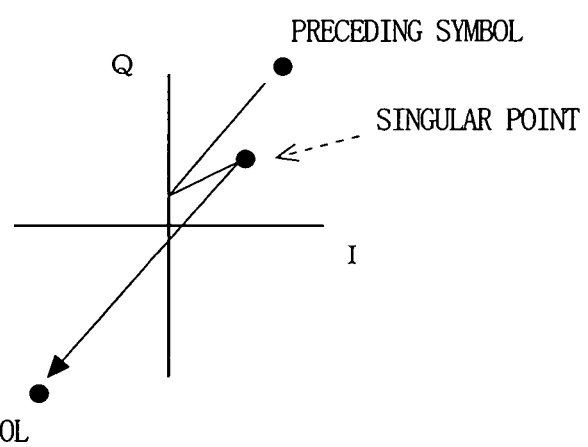

FIG. 2A, FIG. 2B, and FIG. 2C are a diagram explaining how the complex envelope of the modulated signal is changed by the difference of the delay times. The complex envelope can be expressed in a form of a vector which contains an in-phase signal and a quadrature-phase signal. FIG. 2A shows the change in the complex envelope, which occurs when the delay times of the amplitude signal and the phase signal match. FIG. 2B shows the change in the complex envelope, which occurs when the amplitude signal is delayed from the phase signal. FIG. 2C shows the change in the complex envelope, which occurs when the phase signal is delayed from the amplitude signal.

In FIG. 2A, when the delay times of the amplitude signal and the phase signal match, the complex envelope of the modulated signal has a linear waveform. On the other hand, in FIG. 2B and FIG. 2C, when the delay times of the amplitude signal and the phase signal do not match, the complex envelope of the modulated signal has a waveform which is significantly angle-changed (for example, 90 degrees or more) at two observation points in vicinity to an origin point. The one observation point which is more distant from the origin point than the other (i.e., the observation point at which a magnitude of the complex envelope is larger than that at one of the two observation points at which angles significantly change) is referred to as a singular point. The delay control section can determine which one of the amplitude signal and the phase signal is delayed (or advanced) by checking whether this singular point is in vicinity to a preceding symbol or a succeeding symbol when inputted data is modulated. In other words, when the singular point is in vicinity to the succeeding symbol, the delay control section determines that the amplitude signal is delayed from the phase signal (refer to FIG. 2B). And when the singular point is in vicinity to the preceding symbol, the delay control section determines that the phase signal is delayed from the amplitude signal (refer to FIG. 2C).

Here, based on simulation results, a method in which the delay control section calculates the difference between the delay times of the amplitude signal and the phase signal will be described.

Figure 3A:
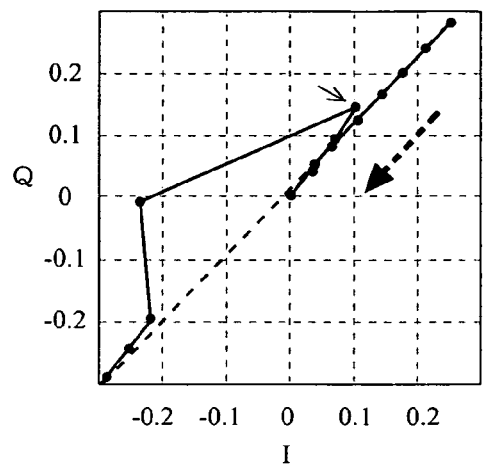
FIG. 3A, FIG. 3B, FIG. 3C, and FIG. 3D are simulation results obtained when a phase signal is delayed from an amplitude signal by 4 samples.
Figure 3B:
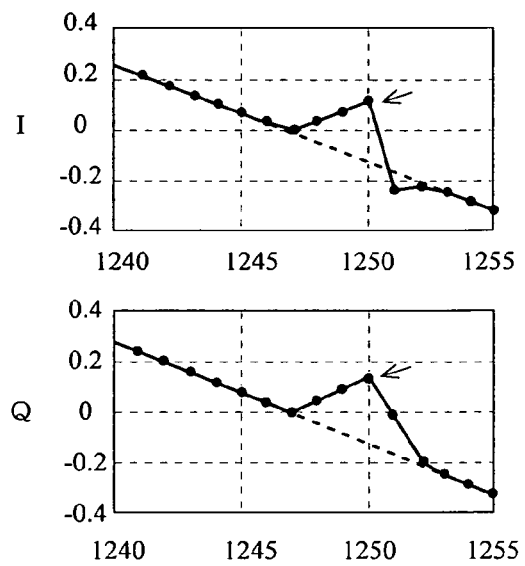
Figure 3C:
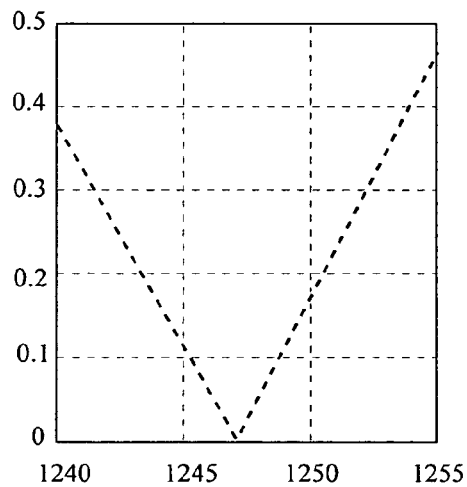
Figure 3D:
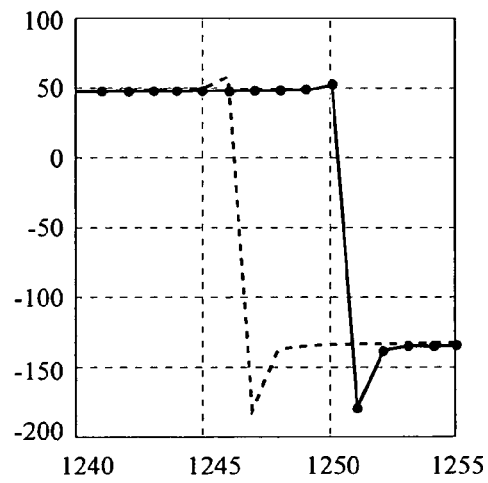

First, simulation results obtained when the phase signal is delayed from the amplitude signal will be described. FIG. 3A, FIG. 3B, FIG. 3C, and FIG. 3D show diagrams explaining the simulation results obtained when the phase signal is delayed by 4 samples (delay=4). FIG. 3A is a diagram explaining a change in the complex envelope by using the in-phase signal and the quadrature-phase signal. In other words, FIG. 3A is a diagram corresponding to FIG. 2C. FIG. 3B is a diagram showing respective time changes in the in-phase signal and the quadrature-phase signal. FIG. 3C is a diagram showing a time change in the amplitude signal. FIG. 3D is a diagram showing a time change in the phase signal. Respective waveforms in FIG. 3A, FIG. 3B, FIG. 3C, and FIG. 3D show examples of sampling modulated signals, which are QPSK modulated signals, at a sampling frequency 64 times a symbol frequency. And continuous lines show waveforms obtained when there is a difference between the delay times of the amplitude signal and the phase signal, whereas dotted lines show waveforms obtained when the delay times of the amplitude signal and the phase signal match.

In FIG. 3A, FIG. 3B, FIG. 3C, and FIG. 3D, an arrow shows a sampling point (i.e., which corresponds to the above-mentioned singular point) at which an angle change of the complex envelope is larger than an angle threshold value and the magnitude of the complex envelope is not minimum. As shown in FIG. 3A, when the singular point is in vicinity to the preceding symbol, the delay control section determines that the phase signal is delayed from the amplitude signal. And the delay control section obtains a difference between the delay times of the amplitude signal and the phase signal based on the change in the complex envelope. In other words, in the simulation results, as shown in FIG. 3B, a center point (0, 0) of the in-phase signal and the quadrature-phase signal is a 1247th sample and a singular point is a 1250th sample respectively. In such a case, the delay control section calculates a difference between the delay times by adding 1 sample to the difference between the singular point and the center point of the in-phase signal and the quadrature-phase signal. In other words, 1250 (the singular point)–1247 (the center point of the in-phase signal and the quadrature-phase signal)+1=4 samples is the difference between the delay times.

FIG. 4A, FIG. 4B, FIG. 4C, and FIG. 4D show simulation results obtained when the phase signal is delayed from the amplitude signal by 2 samples (delay=2). FIG. 4A is a diagram corresponding to FIG. 2C. As shown in FIG. 4A, when the singular point is in vicinity to the preceding symbol, the delay control section can determine that the phase signal is delayed from the amplitude signal. And in these simulation results, as shown in FIG. 4B, the center point (0, 0) of the in-phase signal and the quadrature-phase signal is the 1247th sample and the singular point is a 1248th sample respectively. Also in this case, the delay control section calculates a difference between the delay times by adding 1 sample to the difference between the singular point and the center point of the in-phase signal and the quadrature-phase signal. In other words, 1248 (the singular point)–1247 (the center point of the in-phase signal and the quadrature-phase signal)+1=2 samples is the difference between the delay times.

Figure 5A:
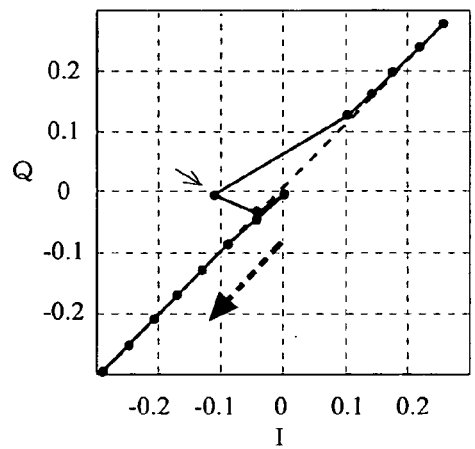
FIG. 5A, FIG. 5B, FIG. 5C, and FIG. 5D are simulation results obtained when the amplitude signal is delayed from the phase signal by 2 samples.
Figure 5B:
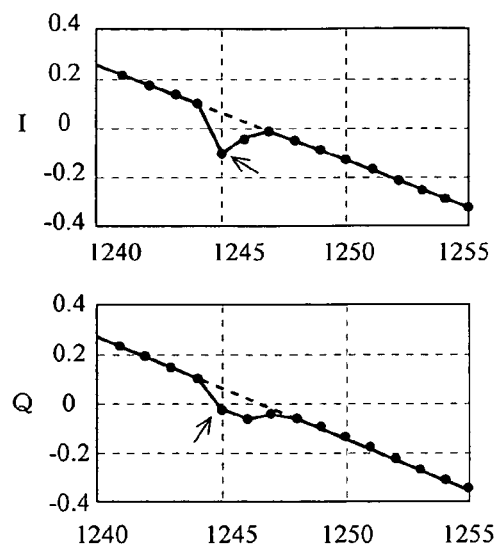
Figure 5C:
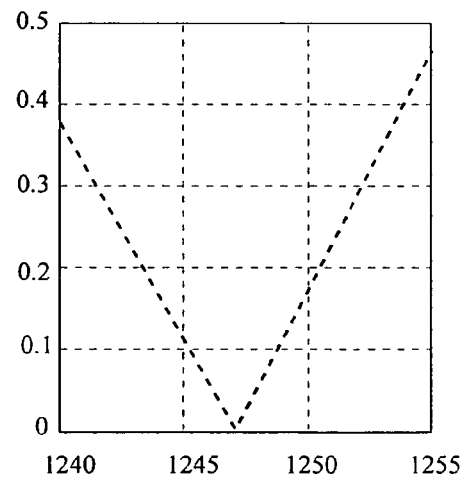
Figure 5D:
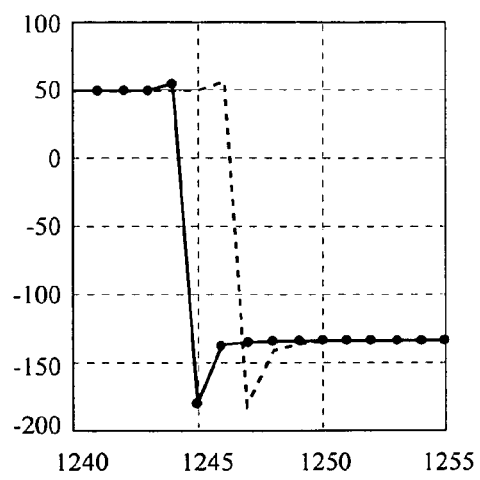

Next, simulation results obtained when the amplitude is delayed from the phase signal will be described. FIG. 5A, FIG. 5B, FIG. 5C, and FIG. 5D show simulation results obtained when the amplitude signal is delayed from the phase signal by 2 samples (delay=2). FIG. 5A is a diagram corresponding to FIG. 2B. As shown in FIG. 5A, when a singular point is in vicinity to a succeeding symbol, the delay control section determines that the amplitude signal is delayed from the phase signal. And in the simulation results, as shown in FIG. 5B, the center point (0, 0) of the in-phase signal and the quadrature-phase signal is a 1247th sample and the singular point is a 1245th sample. In such a case, the delay control section can calculate a difference between the delay times based on a difference between the singular point and the center point of the in-phase signal and the quadrature-phase signal. In other words, 1247 (the center point of the in-phase signal and the quadrature-phase signal)−1245 (the singular point)=2 samples is the difference between the delay times.

Figure 6A:
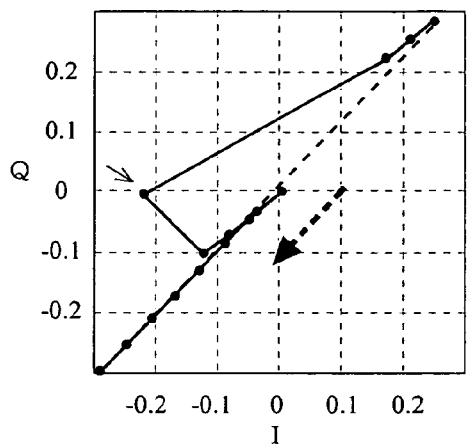
FIG. 6A, FIG. 6B, FIG. 6C, and FIG. 6D are simulation results obtained when the amplitude signal is delayed from the phase signal by 4 samples.
Figure 6B:
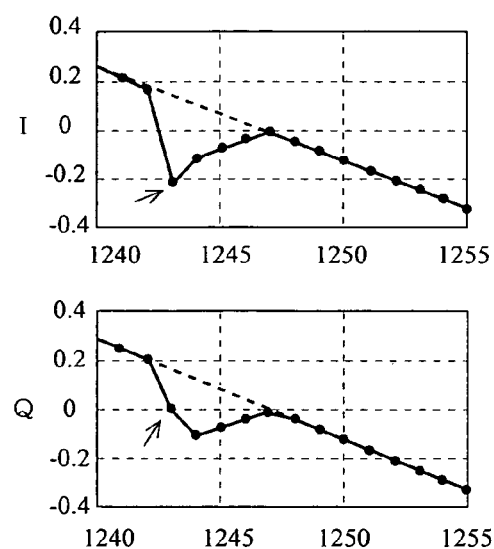
Figure 6C:
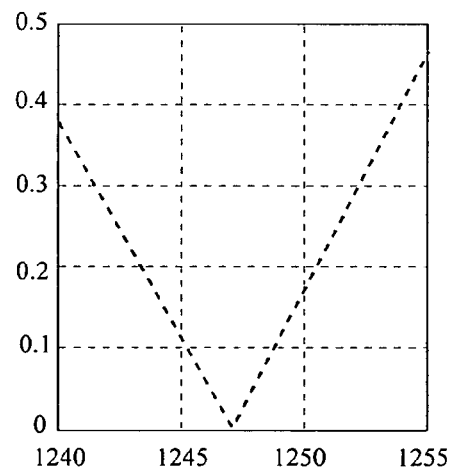
Figure 6D:
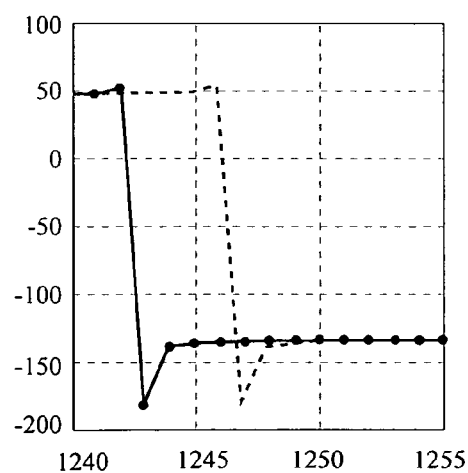

FIG. 6A, FIG. 6B, FIG. 6C, and FIG. 6D show simulation results obtained when the amplitude is delayed from the phase signal by 4 samples (delay=−4). FIG. 6A is a diagram corresponding to FIG. 2B. As shown in FIG. 6A, when the singular point is in vicinity to the succeeding symbol, the delay control section can determine that the amplitude signal is delayed from the phase signal. And in this simulation results, as shown in FIG. 6B, the center point (0, 0) of the in-phase signal and the quadrature-phase signal is a 1247th sample and the singular point is a 1243th sample. In such a case, the delay control section calculates a difference between the delay times based on the difference between the singular point and the in-phase signal and the quadrature-phase signal. In other words, 1247 (the center point of the in-phase signal and the quadrature-phase signal)−1243 (the singular point)=4 samples is a difference between the delay times.

Although in the above-mentioned simulations, a case where a sampling frequency is 64 times a symbol frequency is shown, if the minimum sampling frequency 4 times the symbol frequency is ensured, the sampling frequency may be a value other than that of 64 times the symbol frequency. When the sampling frequency is a large multiple, although processing by the delay control section becomes prolonged, precise adjustment of the delay times is enabled.

Figure 7:
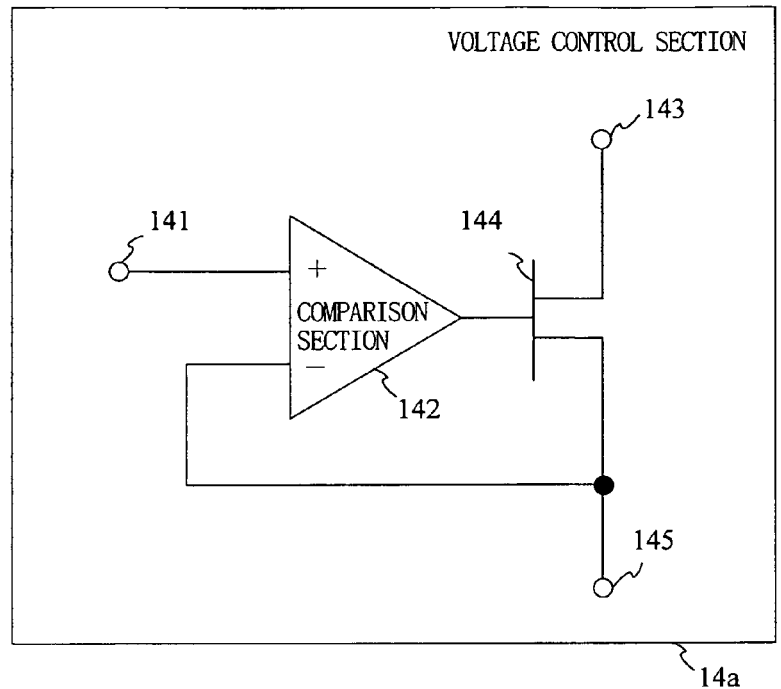
FIG. 7 is a diagram illustrating an exemplary configuration of a voltage control section 14a in which a series regulator is applied.

Next, details on a voltage control section 14a, the amplitude modulator 15, the delay detection section 18 will be described. FIG. 7 is a diagram illustrating an exemplary configuration of the voltage control section 14a in which a series regulator is applied. In FIG. 7, the voltage control section 14a includes an input terminal 141, a comparison section 142, a power source terminal 143, a transistor 144, and an output terminal 145. As the transistor 144, a field-effect transistor is used. An amplitude signal is inputted to the input terminal 141 from the delay adjuster 12. The amplitude signal is inputted via the comparison section 142 to a gate of the transistor 144. A DC voltage is supplied to a drain of the transistor 144 from the power source terminal 143. The transistor 144 outputs from a source thereof a voltage in proportion to the inputted amplitude signal. The voltage outputted from the source of the transistor 144 is fed back to the comparison section 142. Based on the voltage fed back, the comparison section 142 adjusts a magnitude of the amplitude signal which is inputted to the gate of the transistor 144. As described above, the voltage control section 14a in which the series regulator is applied can supply the voltage in proportion to the amplitude signal from the output terminal 145 in a stable manner.

Figure 8:
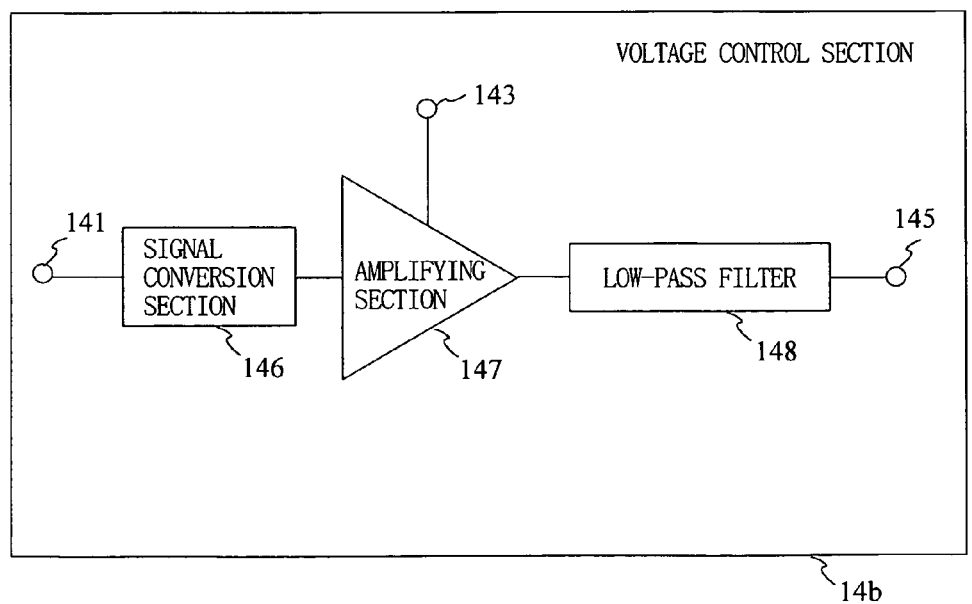
FIG. 8 is a diagram illustrating an exemplary configuration of a voltage control section 14b in which a switching regulator is applied.

FIG. 8 is a diagram illustrating an exemplary configuration of a voltage control section 14b in which a switching regulator is applied. In FIG. 8, the voltage control section 14b includes the input terminal 141, the power source terminal 143, a signal conversion section 146, an amplifying section 147, a low-pass filter 148, and the input terminal 145. An amplitude signal is inputted to the input terminal 141 from the delay adjuster 12. The amplitude signal is inputted to the signal conversion section 146. The signal conversion section 146 converts the inputted amplitude signal to a PWM signal or a delta-sigma modulated signal. The signal converted by the signal conversion section 146 is inputted to the amplifying section 147. The amplifying section 147 amplifies the inputted signal to be outputted. A DC voltage is supplied from the power source terminal 143 to the amplifying section 147. And as the amplifying section 147, a high-efficiency switching amplifier such as Class D amplifier is used.

The signal outputted by the amplifying section 147 is inputted to the low-pass filter 148. The low-pass filter 148 removes quantization noise and switching noise from the signal outputted by the amplifying section 147. The signal from which noise is removed by the low-pass filter 148 is outputted from the output terminal 145 as a voltage in proportion to the amplitude signal. In order to stabilize the voltage to be outputted, the voltage control section 14b may feed back to the signal conversion section 146 the signal outputted from the low-pass filter 148.

Figure 9:
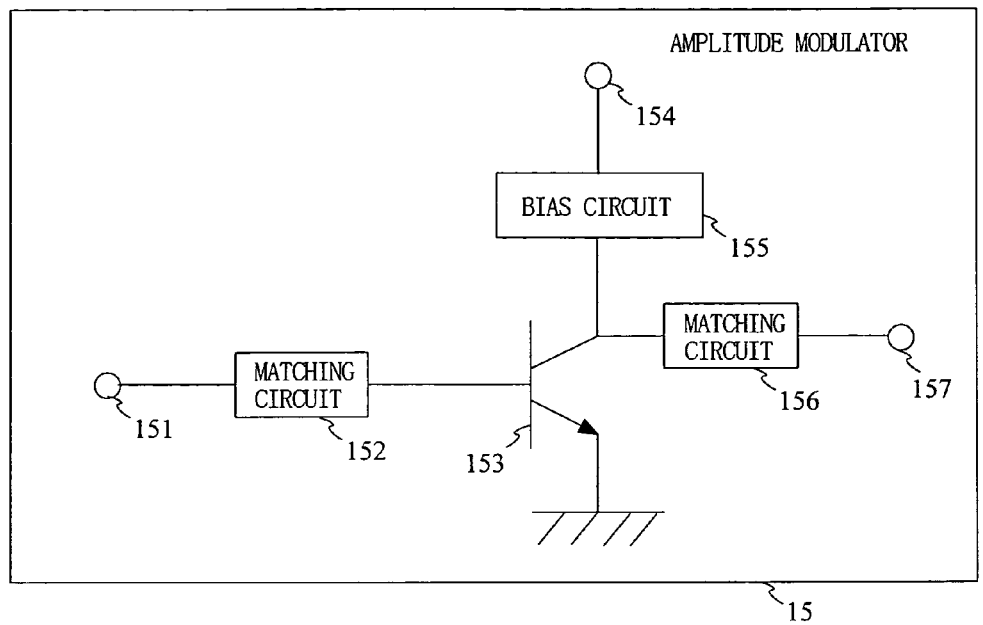
FIG. 9 is a block diagram illustrating an exemplary configuration of an amplitude modulator 15.

FIG. 9 is a block diagram illustrating an exemplary configuration of the amplitude modulator 15. In FIG. 9, the amplitude modulator 15 includes an amplitude modulator 15, an input terminal 151, a matching circuit 152, a transistor 153, a power source terminal 154, a bias circuit 155, a matching circuit 156, and an output terminal 157. As the transistor 153, a bipolar transistor is used. An angle-modulated signal is inputted to the input terminal 151 from the angle modulator 13. The angle-modulated signal is inputted via the matching circuit 152 to a base of the transistor 153. On the other hand, a voltage in accordance with the amplitude signal is supplied to the power source terminal 154 from the voltage control section 14. The voltage supplied to the power source terminal 154 is supplied via the bias circuit 155 to a collector of the transistor 153. The transistor 153 realizes amplitude modulation by amplifying the angle-modulated signal so as to become an output voltage in proportion to the voltage (i.e. a collector voltage) supplied to the collector thereof. The signal (modulated signal) amplitude-modulated by the transistor 153 is outputted via the matching circuit 156 from the output terminal 157.

Figure 10:
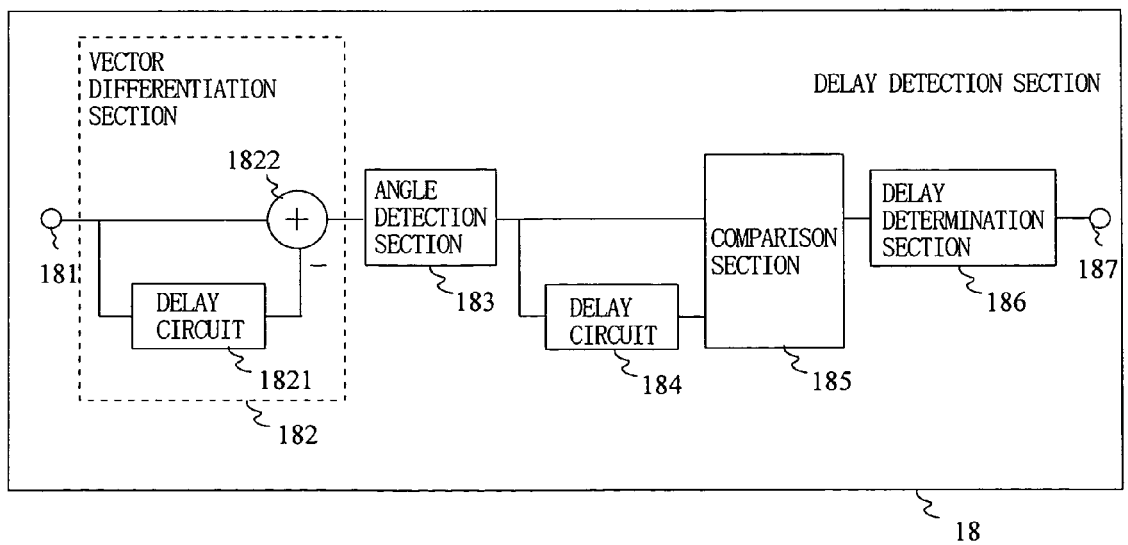
FIG. 10 is a block diagram illustrating an exemplary configuration of a delay detection section 18.
Figure 11:
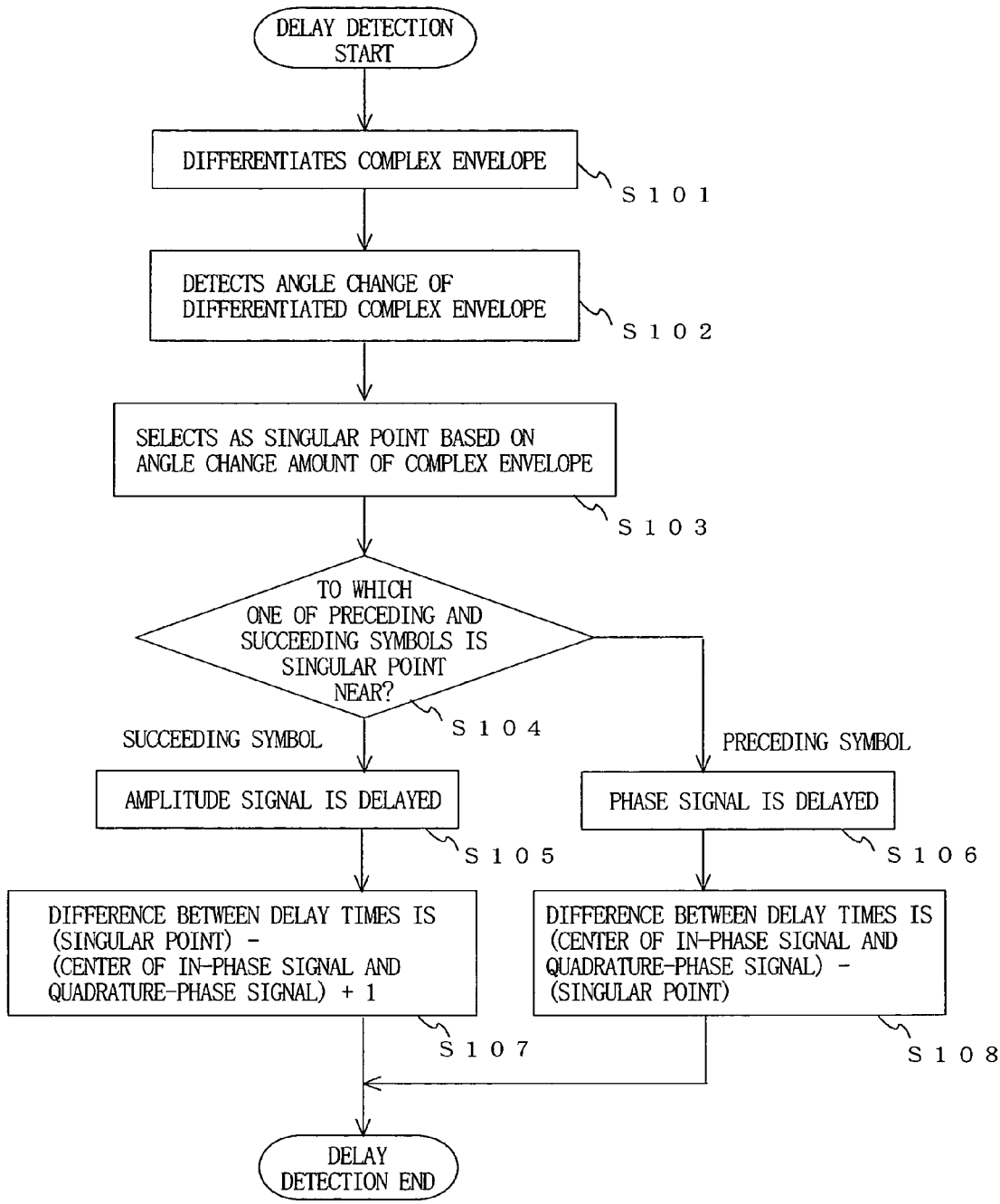
FIG. 11 is a flowchart showing an example of delay detection operations at the delay detection section 18.

FIG. 10 is a block diagram illustrating an exemplary configuration of the delay detection section 18. In FIG. 10, the delay detection section 18 includes an input terminal 181, a vector differentiation section 182, an angle detection section 183, a delay circuit 184, a comparison section 185, a delay determination section 186, and an output terminal 187. FIG. 11 is a flowchart showing an example of delay detection operations by the delay detection section 18. Hereinafter, with reference to FIG. 11, operations by the delay detection section 18 will be described.

In FIG. 11, a complex envelope outputted from the complex envelope detection section 17 is inputted via the input terminal 181 to the vector differentiation section 182. The vector differentiation section 182 differentiates the complex envelope periodically per predetermined period of time (i.e., at each observation point above described) so as to detect a tangent vector of the complex envelope (step S101). The vector differentiation section 182 includes a delay circuit 1821 and a subtraction device 1822. The angle detection section 183 detects an angle of the tangent vector detected by the vector differentiation section 182 and outputs an angle signal. The delay circuit 184 delays the angle signal, by a predetermined period of time, to be outputted therefrom. The angle signal is inputted to the delay circuit 184 and the comparison section 185. The delay circuit 184 delays the angle signal, by a predetermined period of time, to be outputted therefrom. The angle signal delayed by the delay circuit 184 is inputted to the comparison section 185.

The comparison section 185 compares the angle signal inputted from the angle detection section 183 and the angle signal inputted from the delay circuit 184, thereby detecting a change in the angle signal at each observation point (step S102). And it is determined whether or not the change (i.e., an angle change amount of the complex envelope) in the angle signal is larger than a predetermined angle threshold value. The predetermined angle threshold value is, for example, 90 degrees. When the angle change amount of the complex envelope is determined as being larger than the angle threshold value, the comparison section 185 notifies the determination to the delay determination section 186.

Based on the angle change amount of the complex envelope, the delay determination section 186 selects a singular point (step S103). Specifically, the delay determination section 186 selects two observation points at which angle change amounts of the complex envelope are larger than a predetermined angle threshold value and selects, as a singular point, an observation point at which a magnitude of the complex envelope is larger than that at one of the two observation points.

And based on a positional relationship among the singular point, a preceding symbol, and a succeeding symbol, the delay determination section 186 determines which one of the amplitude signal and the phase signal is delayed (or advanced) (step S104). Specifically, when the singular point is in vicinity to the succeeding point, it is determined that the phase signal is delayed the amplitude signal (step S105). And when the singular point is in vicinity to the preceding point, it is determined that the amplitude signal is delayed from the phase signal (step S106).

And based on a change in the complex envelope, the delay determination section 186 can obtain a difference between the delay times of the amplitude signal and the phase signal. When the delay determination section 186 determines that the phase signal is delayed from the amplitude signal (i.e., the singular point is in vicinity to the succeeding symbol), the delay determination section 186 obtains the difference between the delay times by adding 1 sample to the sample difference between the specific point and the center point of the in-phase signal and the quadrature-phase signal (step S107). On the other hand, when it is determined that the amplitude signal is delayed from the phase signal (i.e., the singular point is in vicinity to the preceding symbol), the delay determination section 186 obtains a difference between the delay times based on a sample difference between the singular point and the center point of the in-phase signal and the quadrature-phase signal (step S108). The delay determination section 186 notifies via the output terminal 187 these pieces of information to the delay setting section 19.

As described above, in the transmitter circuit 1 according to the first embodiment of the present invention, the delay control section sets the amplitude delay time and/or the phase delay time at the delay adjuster 12 so as to decrease a difference between the delay times of the amplitude signal and the phase signal which are contained in the transmission signal. And based on the set amplitude delay time and/or the phase delay time, the delay adjuster 12 adjusts the delay times of the amplitude signal or the delay time of either the amplitude signal or the phase signal, which are/is generated by the data generations section 11, and outputs the amplitude signal and the phase signal. Thus, the transmitter circuit 1 can output the transmission signal in which the delay times of the amplitude signal and the phase signal match and distortion is reduced.

Figure 19:
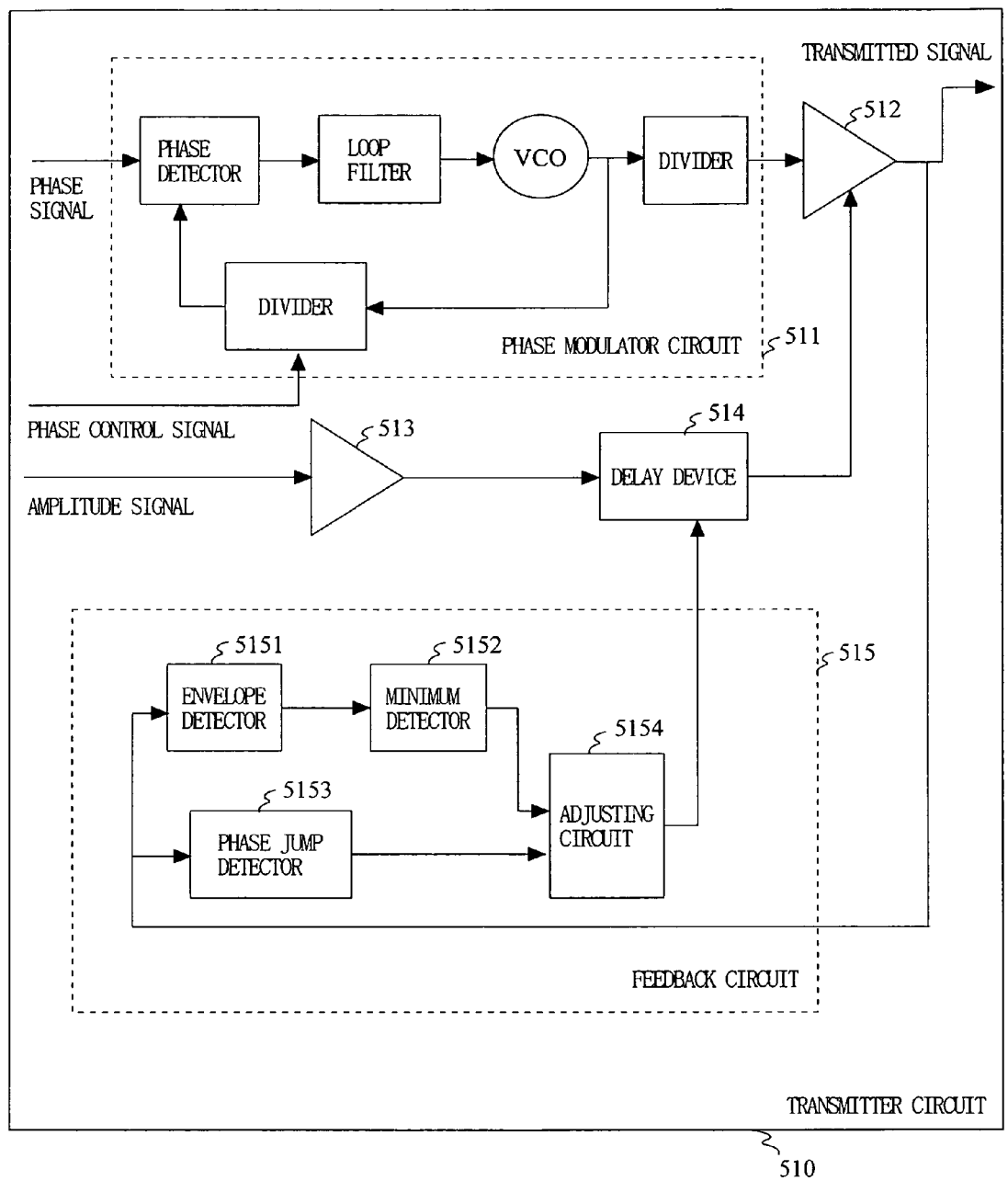
FIG. 19 is a block diagram illustrating an exemplary configuration of a conventional communications device 510.
Figure 20A:
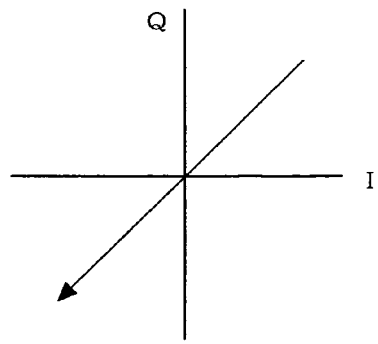
FIG. 20A, FIG. 20B, and FIG. 20C are diagrams explaining a method for detecting a difference between the delay times in a feedback circuit 515.
Figure 20B:
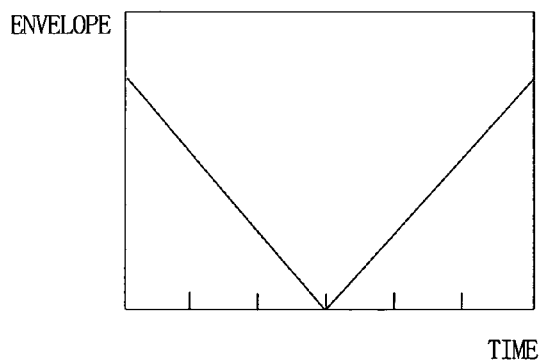
Figure 20C:
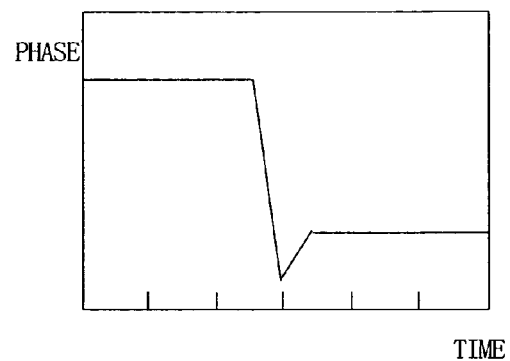
Figure 21:
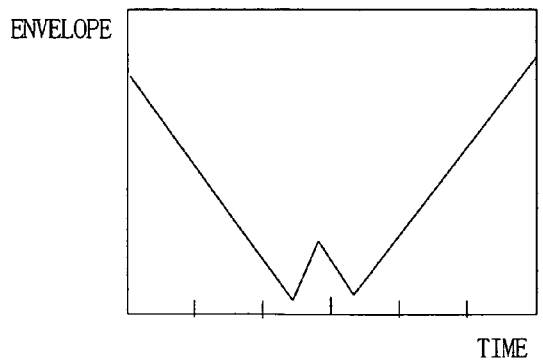
FIG. 21 is a diagram showing a time change in the envelope of a transmission signal on which distortion occurs.

And since the delay control section of the transmitter circuit 1 includes digital components (i.e., the complex envelope detection section 17, the delay detection section 18, and the delay setting section 19), downsizing and high efficiency of the transmitter circuit 1 is enabled as compared to the conventional transmitter circuit 510 (refer to FIG. 19) which includes the feedback circuit 515 having analog components.

Although in the above described transmitter circuit 1, in FIG. 7, the transistor 144 is the field-effect transistor, a bipolar transistor may be used. And although in FIG. 9, the transistor 153 is the bipolar transistor, a field-effect transistor may be used.

Although in the above described transmitter circuit 1, the delay time is set at the delay adjuster 12 using the delay control section each time the transmission signal is outputted (in a real-time manner), the delay control section may be operated upon turning on the transmitter circuit 1 or periodically per predetermined period of time. Thus, the transmitter circuit 1 allows a reduction in power consumption required for operating the delay control section.

Although in the above description, the predetermined angle threshold value for comparing the complex envelope and the angle change is 90 degrees, if it can be determined that the complex envelope is significantly angle-changed, the predetermined angle threshold value may be a value other than 90 degrees.

Unless in the delay detection section 18, a magnitude of the complex envelope is small to some degree, it is likely that a relationship between the delay times of the amplitude signal and the phase signal cannot be accurately detected. Therefore, the transmitter circuit 1 sets an amplitude threshold value and when the magnitude of the envelope is larger than the amplitude threshold value, the delay detection section 18 may not be operated. For example, in the transmitter circuit 1, in a case of a signal such as the above-mentioned QPSK modulated signal (refer to FIG. 3, FIG. 4, FIG. 5, and FIG. 6) passing through in vicinity to an origin point, when an amplitude threshold value is set to 0.3, the delay detection section 18 cannot detect the difference between the delay times. Therefore, in the transmitter circuit 1, when the QPSK modulated signal is used, the amplitude threshold value is, for example, set to 0.1. This allows the transmitter circuit 1 to avoid unnecessary adjustment of the delay times, thereby reducing power consumption.

Figure 12A:
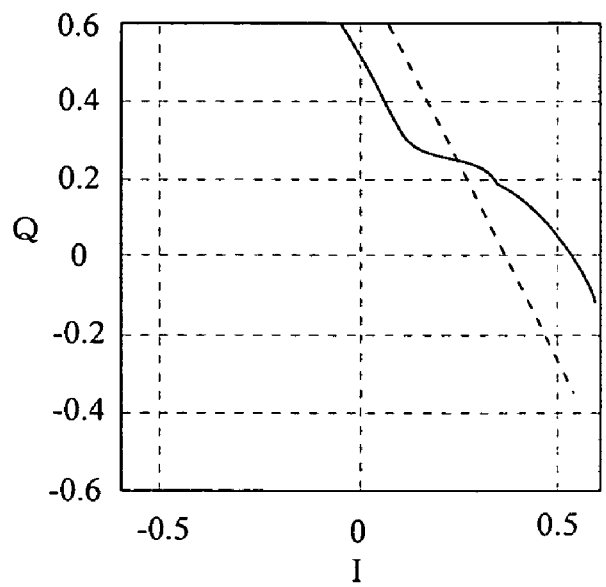
FIG. 12A and FIG. 12B are simulation results in a case where π/4QPSK modulated signal is used as a modulated signal.
Figure 12B:
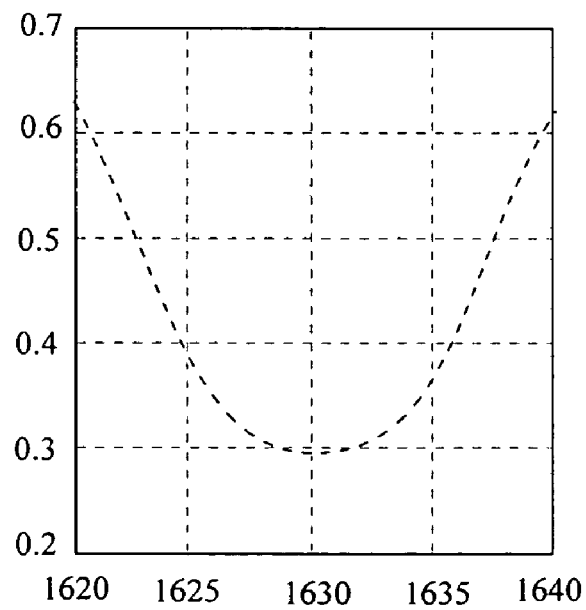

Depending on a modulation method applied to the transmitter circuit 1, a case where the magnitude of the complex envelope is not smaller than the above-mentioned amplitude threshold value and the delay detection section 18 does not normally operate is considered. FIG. 12A and FIG. 12B are diagrams showing simulation results obtained when a π/4 QPSK modulated signal is used as a modulated signal. FIG. 12A is a diagram showing a change in the complex envelope using an in-phase signal and a quadrature-phase signal. FIG. 12B is a diagram showing a time change in the amplitude signal. As shown in FIG. 12A and FIG. 12B, when the π/4 QPSK modulated signal is used as the modulated signal, it is likely that the magnitude of the complex envelope may not be smaller than the predetermined amplitude threshold value. In such as case, in a period of time not affecting communications, for example, during which transmission is turned off, the transmitter circuit 1 may generate a test signal whose complex envelope passes through in vicinity to the origin point and based on the test signal, operate the delay detection section 18. Thus, even when the magnitude of the complex envelope is not smaller than the predetermined amplitude threshold value, the transmitter circuit 1 can output a transmission signal in which the delay times are adjusted and distortion is reduced.

Figure 13:
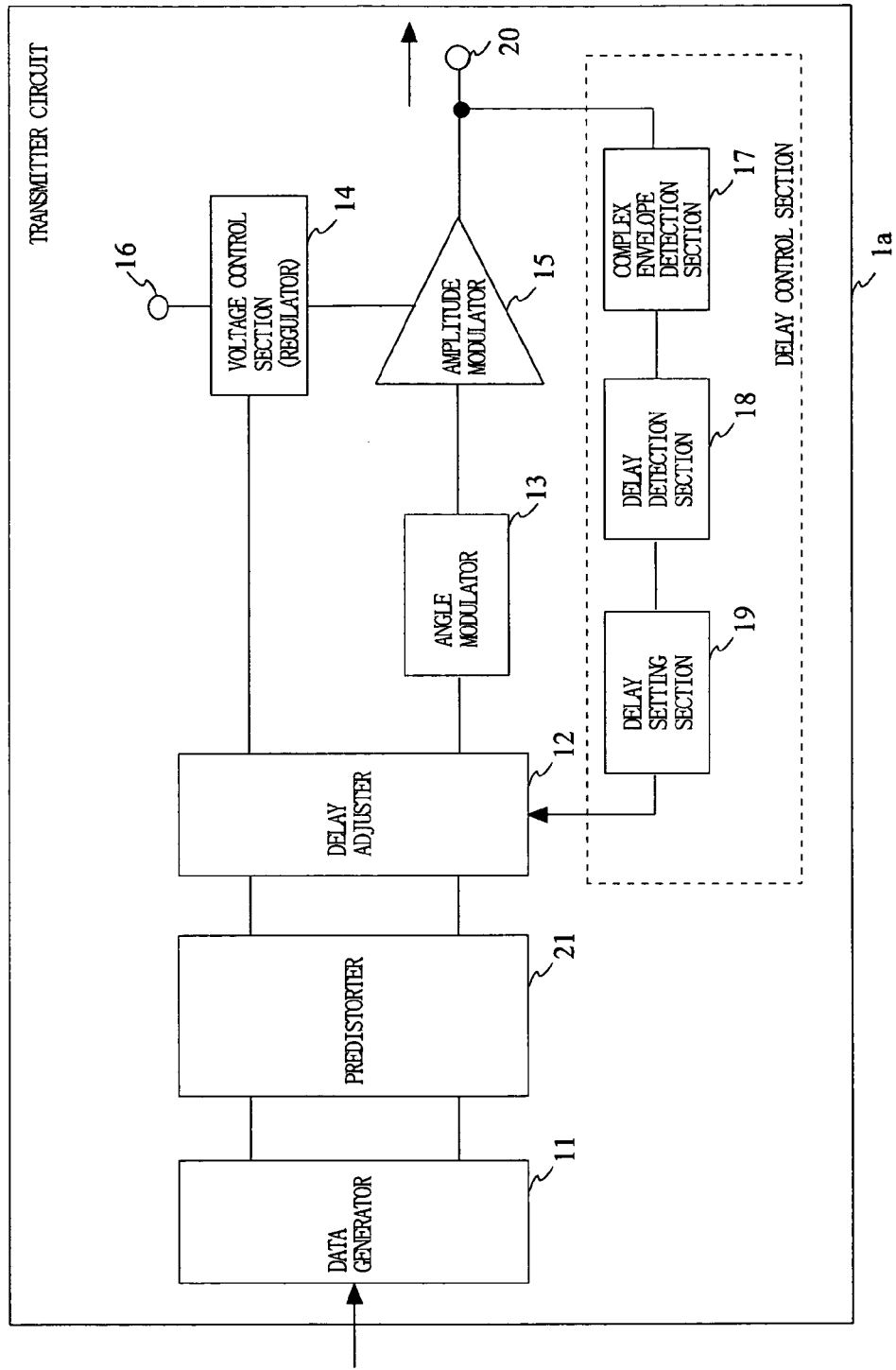
FIG. 13 is a block diagram illustrating an exemplary configuration of a transmitter circuit 1a including a predistorter 21.

Furthermore, when operations/an operation performed by the angle modulator 13 and/or the amplitude modulator 15 are/is not linear, the transmitter circuit 1 may further include a predistorter 21 for compensating distortion of the amplitude signal and the phase signal. FIG. 13 is a block diagram illustrating an exemplary configuration of a transmitter circuit 1*a* including the predistorter 21. In FIG. 13, the predistorter 21 compensates the amplitude signal and the phase signal, which are generated by the data generator 11, so as to suppress distortion generated at least one of the angle modulator 13 or the amplitude modulator 15. Specifically, based on the compensation table, the signal is previously distorted so as to have an inverse characteristic of the magnitude (AM/AM characteristic) of the envelope of the modulated signal outputted from the voltage control section 14, with reference to the bias voltage supplied from the voltage control section 14 to the amplitude modulator 15, and to have an inverse characteristic of a phase difference (AM/PM characteristic) between an input and an output of the amplitude modulator 15, with reference to the bias voltage supplied from the voltage control section 14 to the amplitude modulator 15. Although in the above-mentioned transmitter circuit 1*a*, the example in which the predistorter 21 is connected between the data generator and the delay adjuster 12 is shown, even when the predistorter 21 is connected downstream of the delay adjuster 12, similar effect can be obtained.

Second Embodiment

Figure 14:
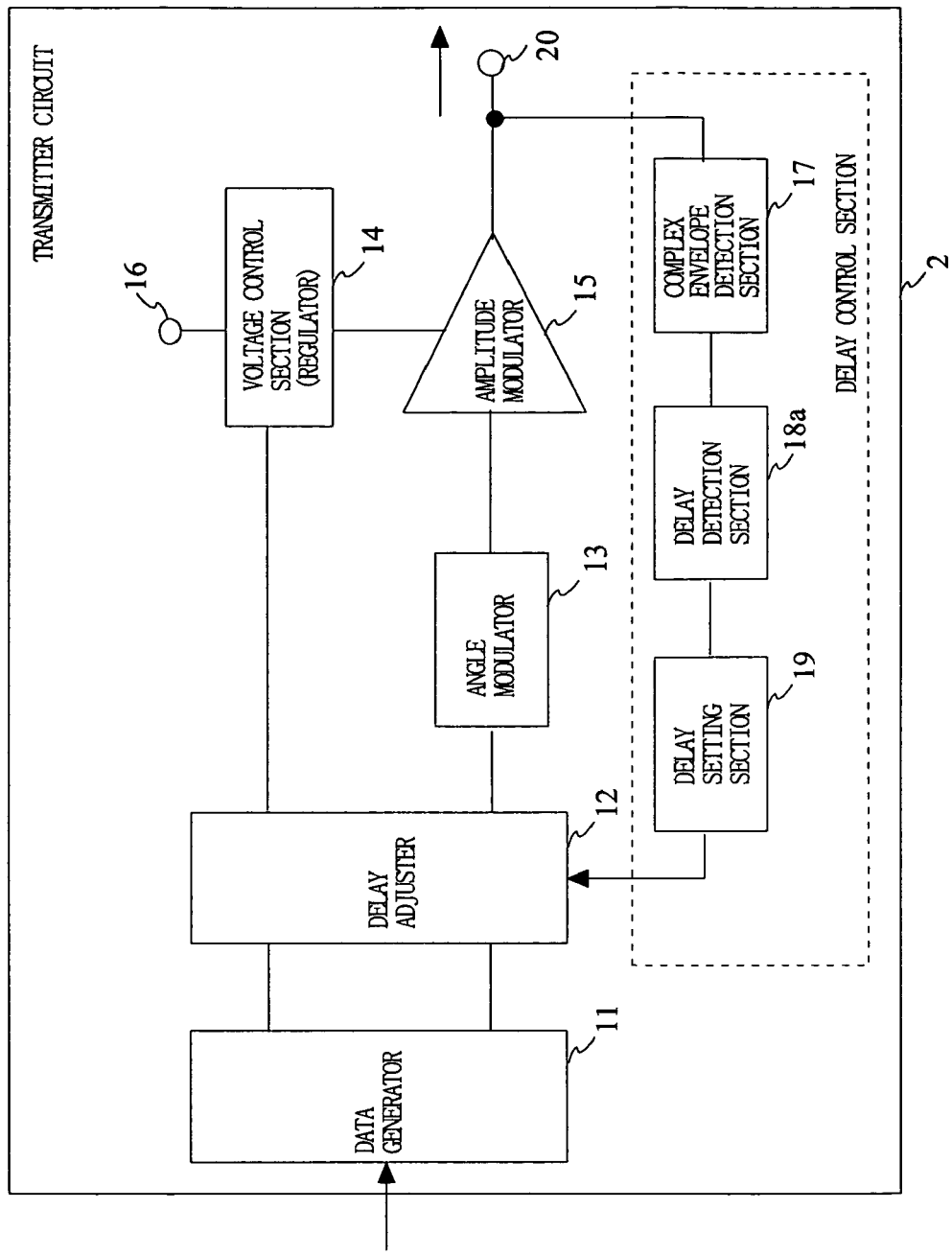
FIG. 14 is a block diagram illustrating an exemplary configuration of a transmitter circuit 2 according to a second embodiment of the present invention.

FIG. 14 is a block diagram illustrating an exemplary configuration of a transmitter circuit 2 according to a second embodiment of the present invention. In FIG. 14, the transmitter circuit 2 according to the second embodiment is different from the transmitter circuit 1 only in a delay detection section 18*a* (refer to FIG. 1). Specifically, the delay detection section 18 shows the complex envelope of the modulated signal outputted by the amplitude modulator 15 using the quadrature data containing the in-phase signal and the quadrature-phase signal, and detects, based on the change amount of the complex envelope shown by the quadrature data, the relationship between the delay times of the amplitude signal and the phase signal. On the other hand, the delay detection section 18*a* according to the second embodiment shows the complex envelope of the modulated signal by using a relationship between the amplitude and time, and based on the angle change of the complex envelope shown by using the relationship between the amplitude and the time, detects the relationship between the amplitude signal and the phase signal.

Figure 15:
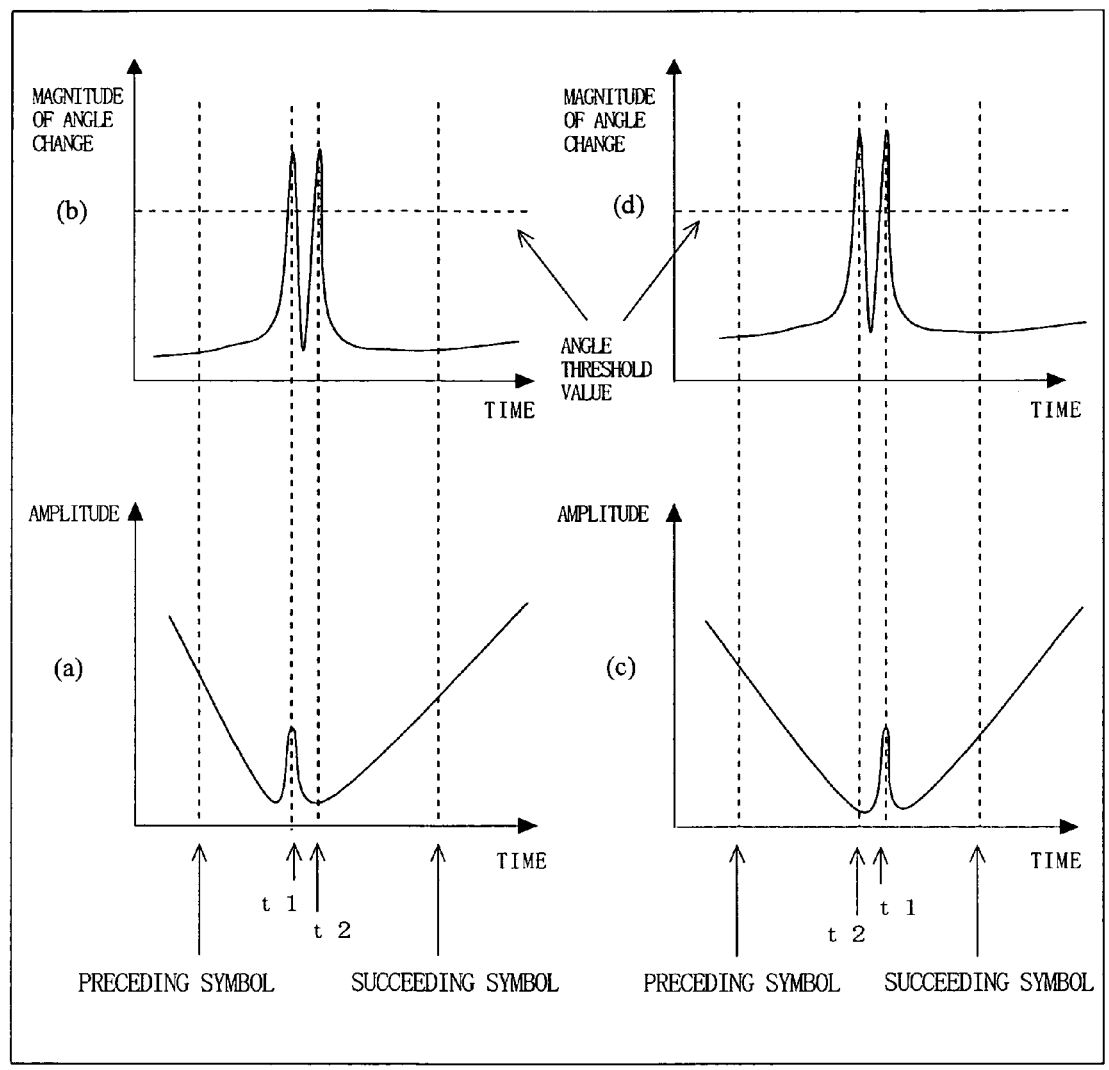
FIG. 15 is a diagram showing a change in the complex envelope of the modulated signal by using an amplitude and time.

FIG. 15 shows diagrams explaining the change in the complex envelope of the modulated signal. In FIG. 15, a diagram (a) shows an envelope obtained when the amplitude signal is delayed from the phase signal. In other words, the diagram (a) shows a diagram corresponding to FIG. 2B. A diagram (b) is a magnitude of the angle change in the complex envelope shown in the diagram (a) (i.e., an absolute value of the angle change). A diagram (c) shows the complex envelope obtained when the phase signal is delayed from the amplitude signal. In other words, the diagram (c) is a diagram corresponding to FIG. 2C. A diagram (d) shows a magnitude (i.e., an absolute value of the angle change) of the angle change of the complex envelope shown in the diagram (c).

In FIG. 15, when the delay times of the amplitude signal and the phase signal do not match, the complex envelope of the modulated signal is a waveform which is significantly angle-changed at two observation points. Of these two observation points, one observation point at which an angle change amount of the complex envelope is larger than the predetermined angle threshold value and a magnitude of the complex envelope is larger than that at one of the two observation points is t1. In other words, t1 corresponds to the above-mentioned singular point. And the other observation point (at which an angle change amount of the complex envelope is larger than the predetermined angle threshold value and a magnitude of the complex is smaller than a magnitude of the complex envelope) is t2.

The delay detection section 18*a* selects the above-mentioned t1 (singular point) and t2 by detecting the angle change amount of the complex envelope. With reference to the diagram (a) in FIG. 15, when a relationship between t1 and t2 on a time axis is observed, it is found that t1 is nearer to a preceding symbol than t2. When t1 is nearer to the preceding symbol than t2, it is determined that the amplitude signal is delayed from the phase signal. On the other hand, with reference to the diagram (c) in FIG. 15, it is found that t1 is nearer to the succeeding symbol than t2. When t1 is nearer to the succeeding symbol than t2, the delay detection section 18*a* determines that the phase signal is delayed from the amplitude signal.

As described above, in the transmitter circuit 2 according to the second embodiment of the present invention, when based on the angle change amount of the complex envelope shown by the relationship of the amplitude and time, the delay detection section 18*a* detects the relationship between the delay times of the amplitude signal and the phase signal, effect similar to that of the transmitter circuit 1 according to the first embodiment above described can be obtained.

Third Embodiment

Figure 16:
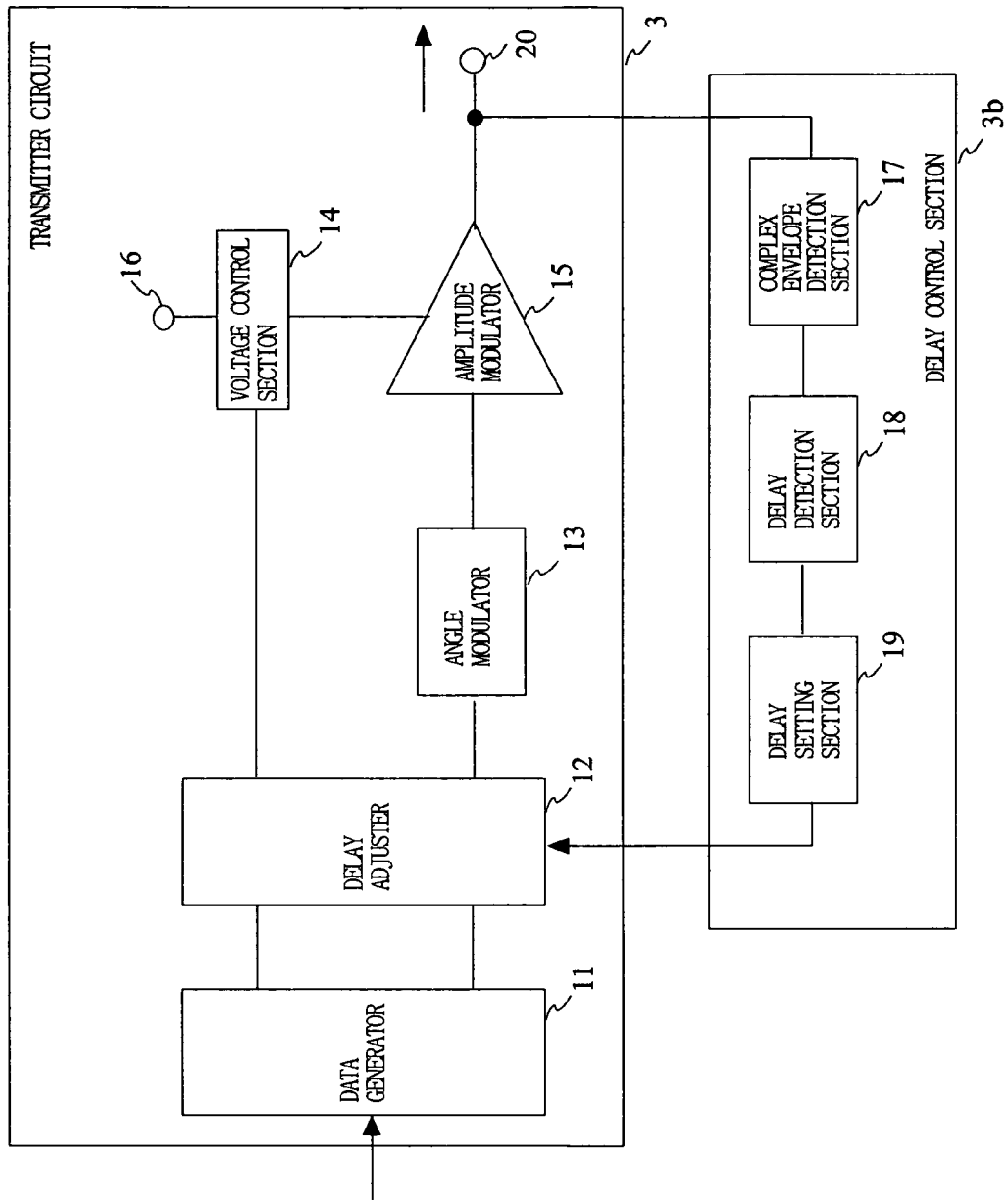
FIG. 16 is a block diagram illustrating an exemplary configuration of a transmitter circuit 3 according to a third embodiment of the present invention.

FIG. 16 is a block diagram illustrating an exemplary configuration of a transmitter circuit 3 according to a third embodiment of the present invention. In FIG. 16, the transmitter circuit 3 of the third embodiment is different from the transmitter circuits 2 and 3 of the first and second embodiments in that a delay control section 3*b* (i.e., a complex envelope detection section 17, a delay detection section 18, and a delay setting section 19) is equipped externally.

The external delay control section 3*b* is connected to the transmitter circuit 3, for example, when manufacturing the transmitter circuit 3 and/or turning on a power source, and by using a method similar to those of the first and second embodiments, sets a delay time of an amplitude signal and/or a delay time of a phase signal at a delay adjuster 12 so that the delay times of the amplitude signal and the phase signal which are contained in the transmission signal match.

As described above, in the transmitter circuit 3 according to the third embodiment of the present invention, the external delay control section 3*b* sets the delay time of the amplitude signal and/or the delay time of the phase signal when manufacturing the transmitter circuit 3 and/or turning on the power source. Thus, even if the transmitter circuit 3 does not internally include the delay control section 3*b*, the transmission signal in which the delay times of the amplitude signal and the phase signal match and distortion is reduced can be outputted.

Fourth Embodiment

Figure 17:
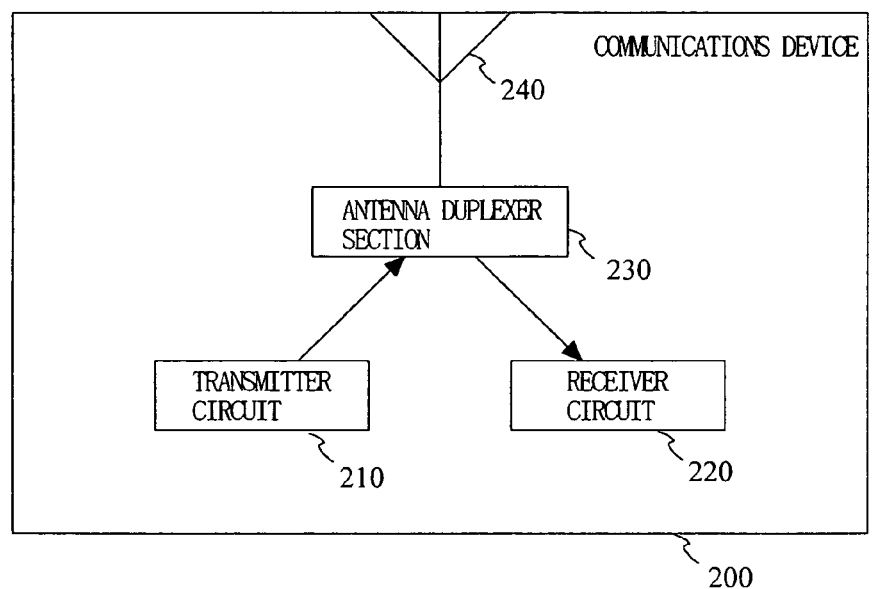
FIG. 17 is a block diagram illustrating an exemplary configuration of a communications device 200 according to a fourth embodiment of the present invention.
Figure 18:
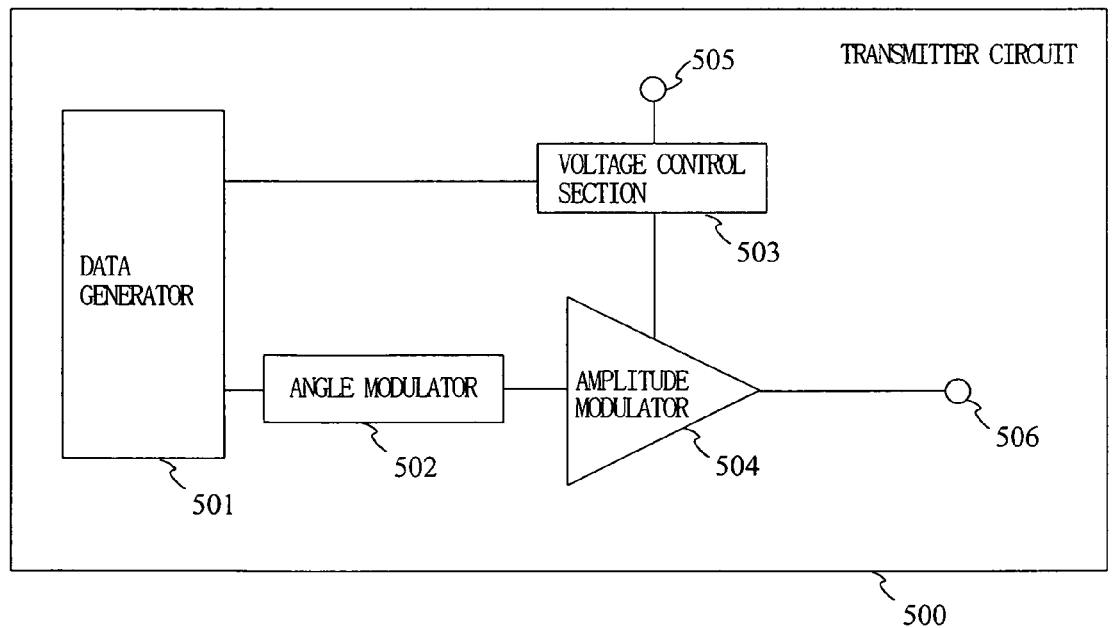
FIG. 18 is a block diagram illustrating an exemplary configuration of a conventional communications device 500.

FIG. 17 is a block diagram illustrating an exemplary configuration of a communications device 200 according to a fourth embodiment of the present invention. In FIG. 17, the communications device 200 according to the fourth embodiment of the present invention includes a transmitter circuit 210, a receiver circuit 220, an antenna duplexer 230, and an antenna 240. The transmitter circuit 210 is either one of the transmitter circuits according to the first, the second, and the third embodiments. The transmitter circuit 210 generates a radio-frequency transmission signal. The transmission signal generated in the transmitter circuit 210 is radiated via the antenna duplexer section 230 from the antenna 240 to the space. On the other hand, the signal received from the antenna 240 is transmitted via the antenna duplexer 230 to the receiver circuit 220 and undergoes receiving processing.

As described above, the communications device 200 according to the fourth embodiment of the present invention, using the transmitter circuit according to the first, the second, or the third embodiment (transmitter circuit for outputting a transmission signal with high efficiency irrespective of bandwidth and operating with high efficiency), is capable of ensuring accuracy of the output signal in wide bandwidth and operating with low power consumption.

The transmitter circuit according to the present invention can be applied to a communications device such as a mobile telephone, a wireless LAN device or the like.

While the invention has been described in detail, the foregoing description is in all aspects illustrative and not restrictive. It is understood that numerous other modifications and variations can be devised without departing from the scope of the invention.

What is claimed is:

1. A transmitter circuit operable to generate and output a transmission signal based on inputted data, comprising:
   a data generator for generating an amplitude signal and a phase signal;
   a delay adjuster for, based on an amplitude delay time which is set for adjusting the amplitude signal and/or a phase delay time which is set for adjusting the phase signal, adjusting a delay time of the amplitude signal generated by the data generator and/or a delay time of the phase signal generated by the data generator, and for outputting the amplitude signal and the phase signal;
   an angle modulator for angle-modulating the phase signal, which is outputted from the delay adjuster, to be outputted as an angle-modulated signal;
   a regulator for outputting a signal in accordance with a magnitude of the amplitude signal outputted from the delay adjuster; and
   an amplitude modulator for amplitude-modulating the angle-modulated signal, by amplifying the angle-modulated signal outputted from the angle modulator in accordance with the signal outputted from the regulator, to be outputted as a modulated signal which has been angle-modulated and amplitude-modulated, wherein
   a complex envelope of the modulated signal outputted from the amplitude modulator is detected,
   the detected complex envelope is observed periodically over a period of time,
   two observation points at which angle change amounts of the complex envelope are larger than a predetermined angle threshold value are selected and an observation point at which a magnitude of the complex envelope is larger than that at one of the two observation points is selected as a singular point,
   based on a positional relationship of the singular point with respect to a preceding symbol upon modulating the data and a succeeding symbol upon modulating the data, it is determined which one of the amplitude signal and the phase signal is advanced or delayed, and
   based on a result of the determination, the amplitude delay time and/or the phase delay time are/is set at the delay adjuster so as to decrease a difference between the delay times of an amplitude signal and a phase signal.

2. The transmitter circuit according to claim 1,
   the delay adjuster further comprising a delay control section for setting the amplitude delay section and/or the phase delay section,
   the delay control section including:
      a complex envelope detection section for detecting the complex envelope of the modulated signal outputted from the amplitude modulator;
      a delay detection section for observing, periodically per predetermined period of time, the complex envelope detected by the complex envelope detection section, selecting two observation points at which angle change amounts of the complex envelope are larger than a predetermined angle threshold value, selecting, as a singular point, an observation point at which a magnitude of the complex envelope is larger than that at one of the two observation points and determining, based on a positional relationship of the singular point with respect to a preceding symbol upon modulating the data and a succeeding symbol upon modulating the data, which one of the amplitude signal and the phase signal is advanced or delayed; and
      a delay setting section for setting the amplitude delay time and/or the phase delay time at the delay adjuster based on the determination result so as to decrease the difference between the delay times of the amplitude signal and the phase signal.

3. The transmitter circuit according to claim 2, wherein the delay detection section
   selects the singular point based on the angle change amount of the complex envelope represented by quadrature data and
   determines that the phase signal is delayed from the amplitude signal when the selected singular point is in vicinity to the preceding symbol and that the amplitude signal is delayed from the phase signal when the selected singular point is in vicinity to the succeeding symbol.

4. The transmitter circuit according to claim 2, wherein the delay detection section
   selects the singular point based on the angle change amount of the complex envelope represented by a relationship between an amplitude and time;
   selects two observation points at which angle change amounts of the complex envelope are larger than a predetermined angle threshold value and selects an observation point at which a magnitude of the complex envelope is smaller than that at one of the two observation points; and
   determines that the amplitude signal is delayed from the phase signal when the singular point is nearer to the preceding symbol than the selected observation point and that the phase signal is delayed from the amplitude signal when the singular point is nearer to the succeeding symbol than the selected observation point.

5. The transmitter circuit according to claim 2, wherein the delay setting section sets, based on the determination result obtained in the delay detection section, the amplitude delay time or the phase delay time at the delay adjuster so that a preceding one of the amplitude signal or the phase signal is delayed by a predetermined period of time.

6. The transmitter circuit according to claim 2, wherein
   the delay detection section further calculates a difference between the delay times of the amplitude signal and the phase signal based on the positional relationship of the singular point with respect to the preceding symbol and the succeeding symbol, and
   the delay setting section sets the amplitude delay time and the phase delay time at the delay adjuster based on the determination result obtained at the delay detection section so that a delay time of a preceding one of the amplitude signal and the phase signal is delayed by a calculated difference between the delay times.

7. The transmitter circuit according to claim 2, wherein the angle change amount of the complex envelope is calculated based on an angle change in a linear curve connecting the above observation points on the complex envelope.

8. The transmitter circuit according to claim 7, wherein the delay detection section includes:
   a differentiation section for differentiating the complex envelope per the observation point;
   an angle detection section for detecting an angle, to be outputted as an angle signal, of the complex envelope differentiated at the differentiation section;
   a delay circuit, to which a part of the angle signal outputted from the angle detection section is inputted, for delaying the inputted angle signal;
   a comparison section for comparing the angle signal outputted from the angle detection section and the angle signal delayed by the delay circuit and detecting an angle change amount of the complex envelope; and
   a delay determination section for selecting the singular point based on the angle change amount of the complex envelope and determining, based on the positional relationship of the singular point with respect to the preceding symbol and the succeeding symbol, which one of the amplitude signal and the phase signal is advanced or delayed.

9. The transmitter circuit according to claim 1, wherein the regulator is a voltage control type series regulator.

10. The transmitter circuit according to claim 1, wherein the regulator is a voltage control type switching regulator.

11. The transmitter circuit according to claim 1, wherein the regulator is a current control type regulator.

12. The transmitter circuit according to claim 1, further comprising a predistorter for compensating the amplitude signal and the phase signal, which are generated by the data generator, so as to suppress distortion generated in at least either one of the angle modulator and the amplitude modulator.

13. The transmitter circuit according to claim 2, wherein when the magnitude of the complex envelope is larger than the predetermined amplitude threshold value, the transmitter circuit causes the delay detection section not to operate.

14. The transmitter circuit according to claim 2, wherein the transmitter circuit generates a test signal so as to reduce the magnitude of the complex envelope and causes the delay detection section to operate based on the inputted test signal.

15. The transmitter circuit according to claim 1, the amplitude delay time and/or the phase delay time are/is previously set at the delay adjuster.

16. The transmitter circuit according to claim 15, wherein the amplitude delay time and/or the phase delay time are/is set at the delay adjuster by a delay control circuit, and the delay control circuit includes:
   a complex envelope detection section for detecting the complex envelope of the modulated signal outputted from the amplitude modulator;
   a delay detection section for observing, periodically per predetermined period of time, the complex envelope detected by the complex envelope detection section, selecting two observation points at which angle change amounts of the complex envelope are larger than a predetermined angle threshold value, selecting, as a singular point, an observation point at which a magnitude of the complex envelope is larger than that at one of the two observation points, and determining, based on a positional relationship of the singular point with respect to a preceding symbol upon modulating the data and a succeeding symbol upon modulating the data, which one of the amplitude signal and the phase signal is advanced or delayed; and
   a delay setting section for setting the amplitude delay time and/or the phase delay time at the delay adjuster based on the determination result so as to decrease the difference between the delay times of the amplitude signal and the phase signal.

17. A communications device comprising:
   a transmitter circuit for generating a transmission signal; and
   an antenna for outputting the transmission signal generated by the transmitter circuit, wherein
   the transmitter circuit is the transmitter circuit according to claim 1.

18. The communications device according to claim 17, further comprising
   a receiver circuit for processing a signal received from the antenna; and
   an antenna duplexer for outputting the transmission signal generated by the transmitter circuit and outputting the signal received from the antenna to the receiver circuit.

19. A transmission method for generating and outputting a transmission signal based on inputted data, wherein
   an amplitude signal and a phase signal are respectively generated;
   based on an amplitude delay time which is set for adjusting the amplitude signal and/or a phase delay time which are/is set for adjusting the phase signal, a delay time of the amplitude signal generated by a data generator and/or a delay time of the phase signal generated by the data generator are/is adjusted and the amplitude signal and the phase signal are outputted;
   the outputted phase signal is angle-modulated and outputted as an angle-modulated signal;
   a signal in accordance with a magnitude of the amplitude signal is outputted; and
   the angle-modulated signal, by amplifying the angle-modulated signal outputted from a angle modulator in accordance with the signal outputted from a regulator, is outputted as a modulated signal which has been angle-modulated and amplitude-modulated, wherein
   a complex envelope of the outputted modulated signal is detected,
   the detected complex envelope is observed periodically over a period of time,
   two observation points at which angle change amounts of the complex envelope are larger than a predetermined angle threshold value are selected and an observation point at which a magnitude of the complex envelope is larger than that at one of the two observation points is selected as a singular point,
   based on a positional relationship of the singular point with respect to a preceding symbol upon modulating the data and a succeeding symbol upon modulating the data, it is determined which one of the amplitude signal and the phase signal is advanced or delayed, and
   based on a determination result, the amplitude delay time and/or the phase delay time are/is set at a delay adjuster so as to decrease a difference between the delay times of an amplitude signal and a phase signal.

* * * * *